United States Patent
Abi-Karam et al.

(10) Patent No.: US 8,431,730 B2
(45) Date of Patent: Apr. 30, 2013

(54) SULFONATE ESTERS AS LATENT ACID CATALYSTS

(75) Inventors: Farouk Abi-Karam, Wilton, CT (US); Ramanathan Ravichandran, Suffern, NY (US); Raman Subrayan, Louisville, KY (US); Richard A. Abramshe, Highland, NY (US)

(73) Assignee: King Industries, Norwalk, CT (US)

( * ) Notice: Subject to any disclaimer, the term of this patent is extended or adjusted under 35 U.S.C. 154(b) by 1116 days.

(21) Appl. No.: 12/286,792

(22) Filed: Oct. 2, 2008

(65) Prior Publication Data

US 2009/0104363 A1    Apr. 23, 2009

Related U.S. Application Data

(60) Provisional application No. 60/997,296, filed on Oct. 2, 2007.

(51) Int. Cl.
| | |
|---|---|
| *C07C 303/00* | (2006.01) |
| *C07C 309/00* | (2006.01) |
| *B05D 3/00* | (2006.01) |
| *C08K 5/52* | (2006.01) |
| *D06P 1/52* | (2006.01) |
| *C08G 63/60* | (2006.01) |
| *C08L 67/00* | (2006.01) |
| *C08L 73/00* | (2006.01) |
| *C08C 19/20* | (2006.01) |

(52) U.S. Cl.
USPC .......... 558/58; 427/385.5; 524/140; 524/599; 524/609; 525/353

(58) Field of Classification Search ................. 427/385.5
See application file for complete search history.

(56) References Cited

U.S. PATENT DOCUMENTS

| | | | |
|---|---|---|---|
| 3,842,021 A | 10/1974 | Grant et al. | |
| 3,868,338 A | 2/1975 | Parsons et al. | |
| 4,192,826 A | 3/1980 | Beresniewicz et al. | |
| 4,200,729 A | 4/1980 | Calbo | |

(Continued)

FOREIGN PATENT DOCUMENTS

| | | |
|---|---|---|
| GB | 1413054 | 5/1973 |
| GB | 1 361 929 | 7/1974 |
| GB | 1361929 | 7/1974 |
| GB | 1 413 054 | 11/1975 |

OTHER PUBLICATIONS

Proell et al., Alkanesulfonic Acids as Catalysts in Polymerization and Alkylation, Indus. and Engin. Chemistry, Oct. 1949, pp. 2217-2221.

(Continued)

*Primary Examiner* — Peter F Godenschwager
*Assistant Examiner* — David Karst
(74) *Attorney, Agent, or Firm* — Locke Lord LLP; Alan B. Clement; Peter J. Fallon

(57) ABSTRACT

The present invention is directed towards novel sulfonic acid esters as catalysts for crosslinking of polymers having hydroxyl, carboxyl, and amide functional groups with a crosslinking agent and resin compositions containing the same. The present invention provides polymeric film coatings which have superior hardness, impact resistance, adhesion, improved blister resistance, salt spray characteristics and flexibility. These catalysts are especially effective in coil primer formulations containing calcium ion exchange anti-corrosive pigments, where traditional blocked acid catalysts are ineffective.

26 Claims, 3 Drawing Sheets

U.S. PATENT DOCUMENTS

| | | | |
|---|---|---|---|
| 4,251,665 A | 2/1981 | Calbo | |
| 4,281,075 A | 7/1981 | Chattha | |
| 4,431,774 A | 2/1984 | Felder-Schraner et al. | |
| 4,454,274 A | 6/1984 | Singer et al. | |
| 4,469,832 A | 9/1984 | Singer et al. | |
| 4,477,618 A | 10/1984 | Singer et al. | |
| 4,501,854 A | 2/1985 | Singer et al. | |
| 4,504,372 A | 3/1985 | Kirchmayr et al. | |
| 4,510,290 A | 4/1985 | Kirchmayr et al. | |
| 4,734,467 A | 3/1988 | Yamada et al. | |
| 4,812,215 A | 3/1989 | Karabin et al. | |
| 4,968,775 A | 11/1990 | Toman et al. | |
| 6,331,202 B1 | 12/2001 | Pipko | |
| 6,482,536 B1 * | 11/2002 | Tanaka et al. | 428/626 |
| 6,657,007 B2 * | 12/2003 | Gilbert et al. | 525/124 |
| 2006/0127678 A1 * | 6/2006 | Pawlik et al. | 428/413 |
| 2007/0190312 A1 | 8/2007 | Hazan et al. | |

OTHER PUBLICATIONS

Wayne A. Proell et al., "Alkanesulfonic Acids as Catalysts in Polymerization and Alkylation," Industrial and Engineering Chemistry, pp. 2217-2221, vol. 41, No. 10 (Oct. 1949).

International Search Report and Written Opinion mailed Dec. 5, 2008, by the International Searching Authority (International Application No. PCT/US08/11405).

* cited by examiner

SULFONATE ESTERS AS LATENT ACID CATALYSTS

CROSS-REFERENCE TO RELATED APPLICATIONS

This application claims priority from the following U.S. Provisional Application Ser. No. 60/997,296, filed Oct. 2, 2008, entitled "Sulfonate Esters as Latent Acid Catalysts," the disclosure of which is incorporated herein in its entirety by reference for all purposes.

BACKGROUND OF THE INVENTION

1. Field of the Invention

The present invention is directed towards novel sulfonic acid esters as catalysts for crosslinking of polymers having hydroxyl, carboxyl, and amide functional groups with a crosslinking agent and resin compositions containing the same. More particularly, the present invention is directed to the specific use of these catalysts in the crosslinking or curing of hydroxyl, carboxyl or amide containing polymers with an acid catalyzed amino-formaldehyde crosslinking agent, such as, hexamethoxymethylmelamine ("HMMM"), producing polymeric film coatings that have superior hardness, impact resistance, adhesion, improved blister resistance, salt spray characteristics and flexibility.

2. Background Information

Coating compositions, which are capable of acid catalyzed cross-linking generally contain an effective catalytic amount of an acid catalyst. The acid catalyst is added in order to accelerate crosslinking and, thereby, reduce the overall time required for cure. When an acid catalyst is utilized, it is advantageous to have the catalyst present as the free acid because in this manner a rapid cure can be efficiently achieved. However, the presence of the free acid may also cause problems in storage stability, that is, the coating composition will exhibit a tendency to gel and harden during the storage term, thus becoming unfit for use.

Robert Saxon et al., J. of App. Polymer Sc., 8, pp. 475-488 (1964), reported the use of p-toluenesulfonic acid (p-TSA) as a curing catalyst for HMMM alone or in combination with acrylic polymers. It was found that although curing can take place without the presence of an acid catalyst, the rate of cure is very slow and the curing temperature required is very high. The presence of p-TSA lowered the curing temperature and increased the cure rate. However, resin compositions containing p-TSA are unstable at room temperature and require mixing of the ingredients immediately prior to use. This makes it difficult to control the quality of the resin produced and to put together a stable one package coating system.

As a means of circumventing these difficulties, latent or blocked acid catalysts are often utilized to delay the action of crosslinking agents and otherwise postpone the curing mechanism. Latent acid catalysts are formed by preparing a derivative of an acid catalyst, such as p-toluenesulfonic acid (pTSA) or other sulfonic acids. For example, a well-known group of blocked acid catalysts are amine salts of aromatic sulfonic acids. Such sulfonate salts are less active than the free acid in promoting crosslinking. During cure, the catalysts are activated by heating, which results in liberation of the free sulfonic acid catalyst, and the volatile blocking group.

U.S. Pat. No. 4,200,729, and U.S. Pat. No. 4,251,665, for example, describe curing amino resins, e.g., urea-formaldehyde and melamine-formaldehyde thermosetting resin systems, with thermally-decomposable adducts of aromatic sulfonic acids and oxa-azacyclopentanes. The resin products cured with these adducts provide surface coatings having superior water resistance properties.

Grant et al., U.S. Pat. No. 3,842,021 and Parsons et al., U.S. Pat. No. 3,868,338 describe epoxy blocked p-TSA as a catalyst for the curing of polyester-HMMA resins. The catalyst is prepared from p-TSA wherein the acid group is blocked with a compound containing an oxirane group, specifically a bisphenol-A epichlorhydrin epoxy resin. Sulfonic acid catalysts blocked with other groups such as 2-hydroxy-cycloalkyl or aryl substituted 2-hydroxy cycloalkyl groups (U.S. Pat. No. 4,469,832); alpha-hydroxy carbonyl groups (U.S. Pat. No. 4,510,290); beta-hydroxy free groups (U.S. Pat. Nos. 4,454,274 and 4,477,618) and beta-hydroxy carbonyl groups (U.S. Pat. No. 4,504,372) also have been reported.

The compositions of U.S. Pat. Nos. 4,192,826 and 4,281,075 are exemplary of coating compositions that utilize a latent acid catalyst to delay the action of the crosslinking agent until cure. U.S. Pat. No. 4,192,826 is directed to thermosetting liquid coating compositions based on polymer capable of being crosslinked with nitrogen resin crosslinkers, and blocked acid catalyst prepared from materials containing at least one oxirane functionality and a sulfonic acid. The blocked acid catalyst resulting from these reactants is a beta-hydroxy sulfonic acid ester. U.S. Pat. No. 4,281,075 is directed to thermosetting compositions based on a film-forming component bearing or capable of generating hydroxyl functionality, amine-aldehyde crosslinking agent, and a latent acid catalyst having the formula:

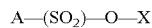

wherein A is selected from alkyl or aryl groups and X is selected from 2-hydroxycycloalkyl and aryl substituted 2-hydroxycycloalkyl groups. The latent acid catalysts depicted by this formula are also beta-hydroxy sulfonic acid esters.

Also exemplary of coating compositions utilizing latent acid catalysts are GB No. 1,361,929 and GB No. 1,413,054.

U.S. Pat. No. 4,469,832 describes a high solids, organic solvent based, sprayable coating composition, which is capable of acid catalyzed crosslinking and is composed of an active hydrogen-containing resin, a curing agent present externally and/or internally as a part of the active hydrogen-containing resin, and a catalytic amount of a non-ionic, saturated or unsaturated organic polycyclic ester of a sulfonic acid.

U.S. Pat. No. 4,454,274 describes a coating composition that is capable of acid catalyzed crosslinking, comprising an active hydrogen-containing resin, a curing agent present externally and/or internally as a part of the active hydrogen-containing resin, and a catalytic amount of a non-ionic cycloaliphatic sulfonic acid ester as the latent acid catalyst.

U.S. Pat. No. 4,501,854 describes a curable composition capable of acid catalyzed crosslinking, comprising an active hydrogen-containing resin, a curing agent present externally and/or internally as a part of the active hydrogen-containing resin, and an acid catalyst, wherein the improvement is alleged to comprise using a catalytic amount of disulfonic acid esters as the latent acid catalyst.

U.S. Pat. No. 4,477,618 describes an organic solvent based coating composition having a total solids content of at least 50 percent and which is sprayable, the coating composition being capable of acid catalyzed crosslinking, comprising an active hydrogen-containing resin, a curing agent present externally and/or internally as a part of the active hydrogen-containing resin, and a catalytic amount of a non-ionic ester of a sulfonic acid.

U.S. Pat. No. 4,812,215 describes an aqueous, cationically electrodepositable coating composition, comprising a ternary sulfonium or quaternary phosphonium group containing resin, an aminoplast or phenoplast crosslinking agent and a catalytic amount of a non-ionic ester of a sulfonic acid as latent acid catalyst.

However, there stills remain a need within the art for coating compositions capable of being acid catalyzed crosslinked having improved storage stability and reduced time required for cure.

SUMMARY OF THE INVENTION

The present invention provides a novel class of non-ionic, saturated or unsaturated organic esters or polyesters of mono and di aromatic sulfonic acids and aliphatic sulfonic acids, which are effective as latent acid catalysts in high solids, coating compositions capable of acid catalyzed crosslinking. The catalyst is represented by the following formulae (i.e., Formulae (I)-(VIII)):

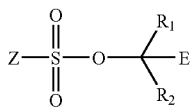
(I)

wherein Z is a organic radical selected from the group consisting of linear, branched, saturated or unsaturated alkyl having from 1 to 40 carbon atoms, cycloalkyl having from 5 to 40 carbon atoms, aryl having from 6 to 40 carbon atoms, aralkyl having from 7 to 9 carbon atoms, wherein the aralkyl optionally may be substituted with an alkyl having from 1 to 36 carbon atoms, and the organic radical being connected to the sulfur atom by a carbon atom.

E is

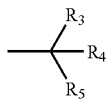

or $C_3$-$C_{20}$ cycloalkyl, and $R_1$, $R_2$, $R_3$, $R_4$ and $R_5$ are independently hydrogen or an organic radical.

In preferred embodiments, the groups, i.e., $R_1$, $R_2$, $R_3$, $R_4$ and $R_5$, can be particularly described in the following manner:

$R_1$ is hydrogen, carboalkoxy, $C_3$-$C_{20}$ alkyl, $C_6$-$C_{18}$ aryl, or $C_3$-$C_{20}$ cycloalkyl;

$R_2$ is hydrogen, carboalkoxy, $C_3$-$C_{20}$ alkyl, $C_6$-$C_{18}$ aryl, or $C_3$-$C_{20}$ cycloalkyl;

$R_3$ is hydrogen, carboalkoxy, acyloxy, N-alkylcarbamyloxy, N-arylcarbamyloxy, $C_3$-$C_{20}$ alkyl, $C_6$-$C_{18}$ aryl, or $C_3$-$C_{20}$ cycloalkyl;

$R_4$ is hydrogen, carboalkoxy, acyloxy, N-alkylcarbamyloxy, N-arylcarbamyloxy, $C_3$-$C_{20}$ alkyl, $C_6$-$C_{18}$ aryl, or $C_3$-$C_{20}$ cycloalkyl; and $R_5$ is hydrogen, carboalkoxy, acyloxy, N-alkylcarbamyloxy, N-arylcarbamyloxy, $C_3$-$C_{20}$ alkyl, $C_6$-$C_{18}$ aryl, or $C_3$-$C_{20}$ cycloalkyl.

Formula (II):

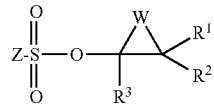

Formula (III):

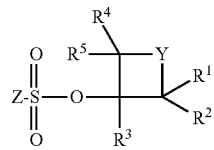

wherein Z is an organic radical selected from the group consisting of linear, branched, saturated or unsaturated alkyl of 1 to 40 carbon atoms, cycloalkyl having from 5 to 40 carbon atoms, aryl having from 6 to 40 carbon atoms, aralkyl having from 7 to 9 carbon atoms, wherein the aralkyl may optionally be substituted with an alkyl having from 1 to 36 carbon atoms, and the organic radical being connected to the sulfur atom by a carbon atom, and wherein, W is $C_1$-$C_{18}$ alkylene, $C_2$-$C_{18}$ alkenylene;

Y is $C_1$-$C_{18}$ alkylene, $C_1$-$C_{18}$ hydroxyl substituted alkylene, $C_2$-$C_{18}$ alkenylene, $C_2$-$C_{18}$ hydroxyl substituted alkenylene; and $R^1$, $R^2$, $R^3$, $R^4$, $R^5$ are independently hydrogen or an organic radical.

Multifunctional variants as described by the following formula:

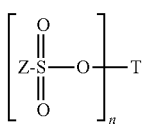
(IV)

wherein Z is an organic radical selected from the group consisting of linear, branched, saturated or unsaturated alkyl having from 1 to 40 carbon atoms, cycloalkyl having from 5 to 40 carbon atoms, aryl having from 6 to 40 carbon atoms, aralkyl having from 7 to 9 carbon atoms, wherein the aralkyl optionally may be substituted with an alkyl having from 1 to 36 carbon atoms, and said organic radical being connected to the sulfur atom by a carbon atom, and the subscript "n" is a number from 2 to 20.

T is a multivalent radical (i.e., n-valent radical, wherein "n" represents the number of groups suitable for attaching to sulfonate ester) selected from the group consisting of alkane or alkene having up to about 200 carbon atoms, an n-valent radical of a cycloalkane or cycloalkene having from 5 to 12 carbon atoms, an n-valent radical of a bicyclic or tricyclic hydrocarbon having from 7 to 12 carbon atoms or an n-valent radical of an aryl, alkyl substituted aryl or aralkyl hydrocarbon having from 6 to 15 carbon atoms, with the provisos that when subscript n is 2, T is an alkylene having from 2 to 40 carbon atoms, a cycloalkylene having from 6 to 10 carbon atoms or alkylenearylenealkylene having from 8 to 10 carbon atoms; when subscript n is 3, T is an alkanetriyl having from 3 to 6 carbon atoms; and when subscript n is 4, T is an alkanetetrayl having from 4 to 6 carbon atoms.

When subscript n is greater than 4, T could be an oligomeric functional hydrocarbon moiety, such as a polyolefin derived from poly(ethylene-vinyl alcohol) copolymer, poly (ethylene-vinyl alcohol-vinyl acetate) copolymer, poly(ethylene-acrylic acid) copolymer, poly(ethylene-methyl acrylate) copolymer, poly(ethylene-methacrylic acid) copolymer, poly(ethylene-methyl methacrylate) copolymer, poly(ethylene-vinyl alcohol-methacrylic acid) copolymer, poly(ethylene-ethyl acrylate-maleic anhydride) copolymer, poly(ethylene-butyl acrylate-maleic anhydride) copolymer, polyethylene-maleic anhydride graft copolymer, poly(ethylene-glycidyl methacrylate) copolymer, polyethylene monoalcohol, and polyethylene monocarboxylic acid, preferably having a molecular weight (average weight) $M_n$: about 500-500000.

Preferred polyolefin polymer backbones are those having a molecular weight (number average) $M_n$ ranging from about 300 to about 200,000, preferably from about 300 to about 50,000, for example from about 300 to about 20,000, in particular from about 300 to about 10,000.

Other non-limiting examples of oligomeric groups that T may represent are those derived from uncrosslinked polyisoprenes or polybutadienes, e.g., Krasol® LB 3000 having a molecular weight $M_n$ of 2300-3000, polyisobutylenes e.g., TPC 535(MW 350), TPC 595(MW 950), TPC 5230(MW 2300), TPC 150(MW 500), TPC 137(MW 350), TPC 160 (MW 600), TPC 168(MW 680), TPC 175(MW 750), TPC 181(MW 810), TPC 1105(MW 1000), TPC 1160(MW 1600), and TPC 1285(MW 3000) from Texas Petrochemicals, polybutenes. Other examples include L-14(Mn 370), L-50(Mn 455), L-65(Mn 435), L-100(Mn 510), H-15(Mn 600), H-25 (Mn 670), H-35(Mn 725), H-40(Mn 750), H-50(Mn 815), H-100(Mn 940), H-300(1330), H-1500(Mn 2145), and H-1900(2270) from AMOCO, and polybutenes PB 24 (Mn 950), PB 32(Mn 1200-1375), PB 122(Mn 2225), PB 124(Mn 2400) and PB 128(Mn 2600) from Soltex. Still other examples include copolymers of mono- and diolefins, for example propylene/butadiene copolymers, styrene/butadiene copolymers or acrylonitrile/butadiene copolymers, terpolymers such as styrene/butadiene/alkylacrylate, terpolymers or styrene/butadiene/methacrylate terpolymers or acrylonitrile/alkylmethacrylate/butadiene terpolymers, terpolymers with ethylene, propylene and a diene, typically hexadiene, dicyclopentadiene, norbornadiene or ethylidenenorbornene, block copolymers of styrene, such as styrene/butadiene/styrene or styrene/isoprene/styrene, graft copolymers of styrene or α-methylstyrene on polybutadiene, polybutadiene containing terminal hydroxyl groups, e.g. KRASOL LBH 3000, linear polycyclopentadienes or cyclic olefins polymerized by ring-opening metathesis, e.g., polyoctenamers, for example Vestenamer® L 3000 (Huls) having a molecular weight $M_n$ of about 2300-3000, or polynorbornenes, e.g., of the Norsorex® type (Nippon Zeon), as well as all polyunsaturated polymeric basic compounds grafted with cyclopentadiene by the Diels-Alder method of the above-mentioned type. It is particularly advantageous to use homo- and copolymers of diolefins, for example butadiene, isoprene or pentadiene, and also of cyclic, optionally polynuclear, diolefins, typically dicyclopentadiene or norbornene as well as ring-opening polymerized cyclic olefins, e.g. polyoctenamers or polynorbornenes.

According to one specific embodiment of the invention polybutadiene ($M_n$: about 1000-200,000), polyisoprene ($M_n$: about 1000-200,000) or polycyclooctenamer ($M_n$: about 1000-200,000) are the oligomeric groups that T may represent.

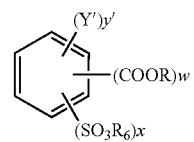

Formula (V)

wherein Y' is a radical independently selected from the group consisting of alkyl having from 1 to 20 carbon atoms, cycloalkyl having from 3 to 20 carbon atoms, aryl having from 6 to 18 carbon atoms, halogen, alkoxy, hydroxyl, and aryloxy; y' is an integer from 0 to 4, w is an integer from 0 to 2, and x is an integer from 1 to 3, with the provisos that when w is 0, y' is an integer from 1 to 4 and x is an integer from 2 to 3 and when y' is 0, w is an integer from 1 to 2 and x is an integer from 1 to 3; R is independently selected from the group consisting of hydrogen, alkyl having from 1 to 20 carbon atoms, cycloalkyl having from 3 to 20 carbon atoms, aryl having from 6 to 18 carbon atoms; and $R_6$ is independently selected from the group consisting of alkyl having from 1 to 100 carbon atoms, cycloalkyl having from 3 to 20 carbon atoms, hydroxyalkyl, and hydroxycycloalkyl.

Formula (VI):

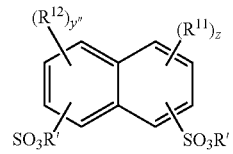

wherein each of $R^{11}$ and $R^{12}$ independently are the same or different and are linear or branched alkyl group having from 6 to 40 carbons, y" is 0 to 3, z is 0 to 3, subscripts y"+z is 1 to 4, and R' is

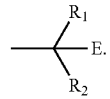

Formula (VII):

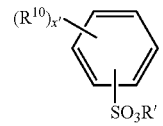

wherein $R^{10}$ is H or an alkyl group having up to 40 carbon atoms, and x' is an integer from 0 to 2, and R' is

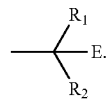

Formula (VIII):

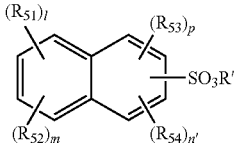

wherein $R_{51}$, $R_{52}$, $R_{53}$ and $R_{54}$ are independently selected from the group consisting of hydrogen or essentially linear or branched hydrocarbyl groups having about 6 to about 40 carbon atoms; with the provisos that when subscripts l, m, n' and p are integers from 0 to 4 and the sum of l+m+n'+p is at least 1 and $R_{51}$, $R_{52}$, $R_{53}$ and $R_{54}$ are independently hydrogen when either l, m, n', or p is 0, and R' is

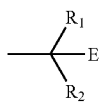

In addition, the catalysts of the present invention have remarkable activity, specifically in primer coatings containing basic pigments such as, for example, oxyaminophosphate salts of magnesium (Pigmentan 465M, E, and EA from Pigmentan), or oxyaminophosphate salt of magnesium modified with a calcium salt (Pigmentan EM from Pigmentan), described in U.S. Pat. Nos. 7,220,297 and 6,331,202 or a calcium ion exchange anticorrosive pigments including SHIELDEX C303 (average particle diameter: 2.5 to 3.5 micron, Ca concentration: 3 wt %), SHIELDEX AC3 (average particle diameter: 2.3 to 3.1 micron, Ca concentration: 6 wt %), and SHIELDEX AC5 (average particle diameter: 3.8 to 5.2 micron Ca concentration: 6 wt %), produced by W. R. Grace & Co.; SHIELDEX (average particle diameter: 3 micron Ca concentration: 6 to 8 wt %) and SHIELDEX SY710 (average particle diameter: 2.2 to 2.5 micron, Ca concentration: 6.6 to 7.5 wt %) (trade names) produced by Fuji Silysia Chemical Ltd. for coil coatings applications. With reduced catalyst pigment interactions and improved cure response one can potentially reduce catalyst use levels in final formulation.

According to certain embodiments, the coating compositions of the present invention also comprise, in addition to any of the previously described corrosion resisting particles, conventional non-chrome corrosion resisting particles. Suitable conventional non-chrome corrosion resisting particles include, but are not limited to, iron phosphate, zinc phosphate, calcium ion-exchanged silica, colloidal silica, synthetic amorphous silica, and molybdates, such as calcium molybdate, zinc molybdate, barium molybdate, strontium molybdate, and mixtures thereof. Suitable zinc hydroxyl phosphate is commercially available from Elementis Specialties, Inc. under the tradename NALZIN® 2. Modification of the foregoing materials are also suitable, such as the modified orthophosphates commercially available from Heubach GmbH, including, for example, zinc aluminum phosphate hydrate, organic-modified basic zinc phosphate hydrates, basic zinc molybdenum phosphate hydrates, modified zinc calcium strontium phosphate silicate hydrates, organic/inorganic modified basic zinc phosphate hydrates, organic/inorganic modified basic zinc phosphate silicate hydrates, and anhydrous calcium hydrogen phosphate. Also useful in the current invention are inorganic corrosion inhibitors HAPLOX SZP-391 (Strontium zinc phosphate), HALOX 430 (heavy metal free calcium phosphate), HALOX CW-491 (Calcium phosphosilicate), HALOX 400 (Barium borophosphate) HALOX300(zincphosphate), HALOXSW-111 (Strontium phosphosilicate), HALOX CW-291(Calcium borosilicate), hybrid corrosion inhibitors HALOX 710, 720 and 750.

The catalysts of the present invention are also useful in the formation of a multi-layer coating, by sequentially applying a primer surfacer, a base coat composition, and a clear coat composition on an automotive substrate in a wet-on-wet-on-wet manner, and simultaneously curing the applied three layers together in a single baking step. The primer surfacer comprises: a film forming binder, typically a highly branched acrylic polymer having a hydroxyl, carboxyl and/or other crosslinkable functional group and an aminoplast resin crosslinking agent, a volatile organic liquid carrier, and pigment(s). The resulting multi-layered coating film has excellent aesthetic appearance, strike-in resistance, chipping resistance, sag resistance, and film build even when formed in a three wet layered application method.

The prior art described above does not anticipate the use of these catalysts in applications requiring a specific deblocking profile, while maintaining the non interaction with basic anti corrosive pigments used in various coating applications.

Furthermore, the inventive catalysts are useful in the crosslinking or curing of hydroxyl, carboxyl or amide containing polymers for producing polymeric film coatings that have superior hardness, impact resistance, adhesion, improved blister resistance, salt spray characteristics and flexibility. The instant catalysts are especially effective in coil primer formulations containing calcium ion exchange anticorrosive pigments, where traditional blocked acid catalysts are ineffective. In addition, the unique deblocking profile of these sulfonate esters provides the so called snap cure at the desired peak metal temperature (PMT), and within specified time are beneficial in preventing popping, a problem seen in coil applications with conventional epoxy, and amine blocked catalysts.

The novel acid catalysts of the present invention, being amine free, do not suffer from the amine induced discoloration typically seen in automotive coatings and coil coatings with amine blocked acid catalysts. The ester blocking group imparts exceptional thermal and storage stability to coating formulations containing the catalysts of the present invention, as compared to other covalent blocked catalysts like the epoxy blocked variants. Also, other uses include utility in exterior can coatings, metal extrusion coatings, general industrial coatings, and appliance coatings, where the deblocking profile of the catalysts of the present invention provides similar benefits, including, but not limited to, stable one package coating systems. Also contemplated by the present inventors are uses in automotive primers and basecoats applied using the wet on wet on wet process, where excellent aesthetic appearance, strike-in resistance, sag resistance, stone chip resistance and intercoat adhesion result from the use of these catalysts.

Particularly noteworthy is the use of these catalysts in coil coatings where their good solubility in typical polyester formulations, reduction in popping, good appearance/flow, pot life, non-yellowing characteristics, and unique deblocking profile are useful as compared to amine and epoxy blocked versions of the same.

DETAILED DESCRIPTION OF THE DRAWINGS

DETAILED DESCRIPTION OF THE INVENTION

Figure 1:
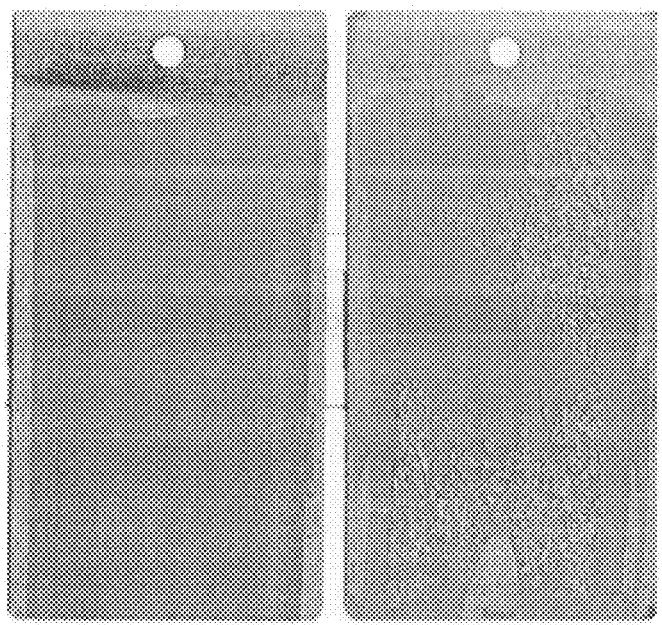
FIG. 1 illustrates a comparison of popping resistance of present invention and a comparative example coating study.

Other than in the working examples or where otherwise indicated, all numbers expressing amounts of materials, reaction conditions, time durations, quantified properties of materials, and so forth, stated in the specification and claims are to be understood as being modified in all instances by the term "about."

It will also be understood that any numerical range recited herein is intended to include all sub-ranges within that range and any combination of the various endpoints of such ranges or subranges.

It will be further understood that any compound, material or substance which is expressly or implicitly disclosed in the specification and/or recited in a claim as belonging to a group of structurally, compositionally and/or functionally related compounds, materials or substances includes individual representatives of the group and all combinations thereof.

The present invention is directed to a curable organic solvent based anticorrosive primer or coating composition comprising a total solids content of at least 50 percent. The coating composition is capable of acid catalyzed crosslinking and containing at least one active hydrogen-containing resin, at least one curing agent present externally and/or internally as a part of the active hydrogen-containing resin, optionally, at least one basic anticorrosive pigment, and a catalytic amount of at least one non-ionic ester of a sulfonic acid of the present invention.

The aforesaid latent acid catalysts for use in the present invention can be produced from the reaction of an organic alcohol and a sulfonic acid chloride in the presence of an organic solvent and an acid acceptor. Nonlimiting examples of suitable alcohols employed in preparing the claimed latent acid catalysts include various primary, secondary and tertiary alcohols, cyclic, acyclic and polycyclic variants. Nonlimiting examples of suitable acid chlorides include those formed from the following sulfonic acids: methanesulfonic acid, para-toluenesulfonic acid, ortho-carboisopropoxybenzene sulfonic acid, ortho-carbomethoxybenzene sulfonic acid, benzenesulfonic acid, various alkylated benzenesulfonic acids, various substituted alkylated naphthalene sulfonic acids, and dinonylnaphthalene mono and di sulfonic acids. Suitable solvents include methylene chloride, 1,1,1-trichloroethane, toluene and xylene. Nonlimiting exemplary suitable acid acceptors include pyridine, triethylamine, sodium hydroxide, potassium hydroxide, sodium methoxide, sodium hydride, sodium metal, potassium hydride, and potassium-t-butoxide.

A significant aspect of the claimed invention is that the catalysts are beta-hydroxy free sulfonic acid esters; that is, the catalysts of the present invention comprise sulfonic acid esters lacking a hydroxyl group on the carbon atom beta to the sulfonic acid ester linkage. These catalysts lacking such a hydroxyl group are more stable compounds than the conventional latent acid catalysts containing a beta-hydroxyl group. Catalysts containing the beta hydroxyl functional group are more prone to inter molecular alkylation reaction leading to the liberation of free sulfonic acid as a function of time. The slow release of free sulfonic acid can lead to detrimental interaction with basic components present in the formulation.

As a result of this increased stability, not only do the catalysts of the subject invention facilitate single package coating compositions but they also result in coating compositions that have extended shelf life.

The compositions of the present invention comprise an active hydrogen-containing resin, a curing agent present externally and/or internally as a part of the active hydrogen-containing resin, and a catalytic amount of a blocked acid catalyst. The active hydrogen-containing resin is preferably a polymeric polyol having a hydroxyl functionality of at least two. Nonlimiting examples of polymeric polyols useful in the practice of the present invention include hydrocarbon polyols, ester polyols, ether polyols, polyester polyols, polyether polyols, amide polyols, polyamide polyols, urethane polyols, polyurethane polyols, acrylic polyols, urea polyols, polyurea polyols, cyclic nitrogen-containing polyols and mixtures thereof; with the preferred polyols being the low molecular weight acrylic and polyester polyols and also polyurethane polyols. The aforesaid classes of polyols are described in detail in the following paragraphs. Hydrocarbon polyols include, but are not limited to, trimethylolpropane; trimethylolethane; glycerol; 1,2,4-butane triol; 1,2,6-hexane triol; erythritol; sorbitol; mannitol; and diglycerol.

Ester polyols useful in the practice of the present invention are obtained by reacting a polyol with one mole or less of a monocarboxylic acid. The polyols have a hydroxyl functionality of at least 3.0, examples of which are described immediately above. Nonlimiting examples of suitable monocarboxylic acids include benzoic acid, hexanoic acid, octanoic acid, decanoic acid. Lauric acid, myristic acid, stearic acid, oleic acid, linoleic acid and linolenic acid can be used, but are less desirable.

Ether polyols useful in the practice of the present invention are made by reacting a suitable polyol as described above with a monoepoxide, e.g., ethylene oxide, propylene oxide, butyl glycidyl ether, octyl glycidyl ether, allyl glycidyl ether, phenyl glycidyl ether, 1,2-butylene oxide, styrene oxide, glycidyl acrylate, and glycidyl methacrylate.

Polyester polyols useful in the practice of the present invention are generally formed by the esterification of polyols with polycarboxylic acids or acid anhydrides. The polyols conventionally employed in making the polyester polyols include alkylene glycols, such as, but not limited to, ethylene glycol, propylene glycol, butylene glycol and neopentyl glycol, and other glycols such as hydrogenated bisphenol A, cyclohexanedimethanol, caprolactone-diol reaction products, hydroxyalkylated bisphenols, polyether glycols, e.g., poly(oxytetramethylene) glycol, and similar type compounds known to those skilled in the art. Other diols of various types and polyols of higher functionality can also be used. Such higher polyols include, but are not limited to, trimethylolpropane, trimethylolethane, pentaerythritol and higher molecular weight polyols, such as obtained by the reaction product of ethylene oxide and trimethylolpropane and various hydrolyzed epoxide resins.

Suitable carboxylic acids used in the reaction with the above described polyols include, but are not limited to, phthalic, isophthalic, terephthalic, tetrahydrophthalic, hexahydrophthalic, adipic, azelaic, sebacic, maleic, glutaric chlorendic, tetrachlorophthalic, fumaric, itaconic, malonic, suberic, 2-methylsuccinic, 3,3-diethylglutaric, 2,2-dimethylsuccinic acid and trimellitic acid. Anhydrides of these acids where they exist can also be employed and are encompassed by the term "carboxylic acid." Monocarboxylic acids such as benzoic acid and hexanoic acid can also be used, provided the average functionality of the polyol is above about 2.0. Saturated acids (including those aromatic acids where the only unsaturation is in the aromatic ring) are preferred.

It is also possible to produce polyester polyols containing one or two alkylene oxide groups per hydroxy group and preferably no more than three alkylene oxide groups per ester group for use in the practice of the present invention. The alkylene oxide-derived polyester polyol can be produced by substituting an alkylene oxide-derived polyol for all or part of the polyol component used to produce the polyester polyol. Useful alkylene oxide-derived polyols include diethylene glycol, triethylene glycol, dipropylene glycol, tetraethylene glycol, 2,2-bis(hydroxyethoxyphenyl) propane and 2,2-bis (beta-hydroxypropoxyphenyl) propane. These polyester polyols can also be produced by oxalkylating any one of the above-described polyester polyols.

Polyester polyols useful in the practice of the present invention can also be made from the reaction of a lactone with a polyol. The lactones, commercially available, are represented by the structure:

wherein n is from 2 to 9 and the R's are hydrogen, alkyl, cycloalkyl, alkoxy and single ring aromatic hydrocarbon radicals. Preferred lactones are the epsilon-caprolactones where n equals 5. Polyols, such as the above-described diols and triols are used in the reaction with the lactone. Nonlimiting examples of suitable polyether polyols are polyalkylene ether polyols which include those having the following structural formula:

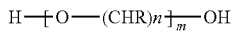

where the substituent R is hydrogen or lower alkyl containing from 1 to 5 carbon atoms including mixed substituents, n is from 2 to 6 and m is from 2 to 20. Included are poly(oxytetramethylene) glycols, poly(oxyethylene) glycols, poly(oxy-1,2-propylene) glycols and the reaction products of ethylene glycol with a mixture of 1,2-propylene oxide and ethylene oxide.

Also useful are polyether polyols formed from oxyalkylation of various polyols, for example, glycols such as, but not limited to, ethylene glycol, 1,6-hexanediol, and bisphenol A, or other higher polyols, such as trimethylolpropane and pentaerythritol. Polyols of higher functionality which can be utilized as indicated can be made, for instance, by oxyalkylation of compounds such as sorbitol or sucrose. One commonly utilized oxyalkylation method is the reaction of a polyol with an alkylene oxide, for example, ethylene or propylene oxide, in the presence of an acidic or basic catalyst.

Polyamide polyol resins useful in the instant invention can comprise those produced using conventional techniques. In general, the resins are produced from any of the above-described polyacids or lactones and diols, triols and higher alcohols and small amounts of diamines or amino alcohols. Suitable diamines and amino alcohols include, but are not limited to, hexamethylenediamine, ethylene-diamine, monoethanolamine, phenylenediamine, toluenediamine and diethanolamine. Amide polyols are also useful herein and are readily prepared by known methods.

Besides the above-mentioned polymeric polyols, polyurethane polyols can also be used. These polyols can be prepared by reacting any of the above-mentioned polyols with a minor amount of polyisocyanate (OH/NCO equivalent ratio greater than 1:1, preferably greater than about 2:1) so that free hydroxyl groups are present in the product. Mixtures of both high molecular weight and low molecular weight polyols may be used. Among the low molecular weight polyols useful in this aspect of the present invention are diols and triols such as aliphatic polyols including alkylene polyols containing from 2 to 18 carbon atoms. Nonlimiting examples include ethylene glycol, 1,4-butanediol, 1,6-hexanediol and cycloaliphatic polyols, such as 1,2-hexanediol and cyclohexanedimethanol. Examples of triols include, but are not limited to, trimethylolpropane and trimethylolethane. Useful high molecular weight polyols are those described above. Also useful are polyols containing ether linkages such as diethylene glycol and triethylene glycol. Also, acid-containing polyols such as, but not limited to, dimethylolpropionic acid and amino alkyl alcohols such as ethanol amine and diethanol amine can be used. In addition to the polyurethane polyols, urethane polyols can also be used and are readily prepared by known methods.

The organic isocyanate which is used to prepare the polyurethane polyols useful in the practice of certain embodiments of the present invention can be an aliphatic or an aromatic isocyanate or a mixture of the two. The aliphatic isocyanates are preferred when exterior durability is a requisite for the desired end use. Also, diisocyanates are preferred although higher polyisocyanates and monoisocyanates can be used in place of or in combination with diisocyanates. Examples of suitable higher polyisocyanates are 1,2,4-benzene triisocyanate and polymethylene polyphenyl isocyanate. Examples of suitable monoisocyanates are butyl isocyanate, cyclohexyl isocyanate, phenyl isocyanate and tolyl isocyanate. Examples of suitable aromatic diisocyanates are 4,4'-diphenylmethane diisocyanate, 1,3-phenylene diisocyanate, 1,4-phenylene diisocyanate and toluene diisocyanate. Examples of suitable aliphatic diisocyanates are straight chain aliphatic diisocyanates such as 1,4-tetramethylene diisocyanate and 1,6-hexamethylene diisocyanate. Also, cycloaliphatic diisocyanates can be employed. Examples include 1,4-cyclohexyl diisocyanate, isophorone diisocyanate, alpha,alpha'-xylylene diisocyanate and 4,4'-methylene-bis(cyclohexyl isocyanate).

The polyurea polyol resins useful in the practice of the present invention are generally produced by reacting any of the above-described polyisocyanates with either an amino alcohol, such as monoethanol amine, or an amino alcohol and a diol. Urea polyols are also useful herein and are readily prepared by known methods.

Suitable cyclic nitrogen-containing polyols include, but are not limited to, such compounds as tris(hydroxyethyl) isocyanurate (THEIC), N,N'-bis(hydroxyethyl)-dimethyl hydantoin (BHDH), 1,4-bis[4,4-bis(hydroxymethyl)-1,3-oxazol-2-ene-2-yl]butane, hydroxyalkylated THEIC, hydroxyalkylated BHDH, bis(hydroxyethyl)ethylene urea, and 4,4-bis(hydroxymethyl)-1,3-oxazolidin-2-one.

Preferably, thermosetting acrylic polyols comprising the hydroxyalkyl esters of ethylenically-unsaturated carboxylic acids and at least one other ethylenically unsaturated monomer copolymerizable therewith, such as are described in U.S. Pat. Nos. 2,681,897 and 3,084,184 are used herein. Preferred interpolymers of the class described are those containing hydroxyalkyl esters in which the alkyl group has up to about 18 carbon atoms. Especially preferred esters are acrylic acid and methacrylic acid esters of ethylene glycol and 1,2-propylene glycol, i.e., hydroxyethyl acrylate and methacrylate, and hydroxypropyl acrylate and methacrylate. However, there may also be employed similar esters of other unsaturated acids, for example, ethacrylic acid, crotonic acid, and similar acids having up to about 6 carbon atoms, as well as esters containing other hydroxyalkyl radicals, such as hydroxybutyl esters and hydroxylauryl esters.

Acrylic resins having either a carboxyl, hydroxyl or amide functional group, such as obtained by copolymerization of the $C_1$ to $C_{18}$ alkyl ester of acrylic or methacrylic acid, styrene or substitutes styrene or acrylonitrile with functional monomers such as acrylic or methacrylic acid or the B-hydroxyalkylester of above acids are contemplated for use in the practice of the present invention. Typically, the acrylic polymers have a molecular weight from about 2,000 to about 100,000. They are produced by conventional solution or bulk polymerization methods using free radical, or, if applicable, using ionic catalysts.

Copolymers of above acrylate monomers with the $C_1$ to $C_{18}$ ester or the hydroxyalkyl ester or half ester of maleic, fumaric or itaconic acid may also be used in the compositions of the present invention. Optionally, these resins can also contain other functional groups such as those derived from the acetoacetoxyethyl methacrylate or acrylamide monomer. In addition, the acrylic resin can contain other non acrylate monomers such as vinylether or vinylacetate or vinylchloride. Acrylic copolymers, copolymers of butylacrylate/styrene/hydroxyalkylacrylate/acrylic acid with a molecular weight of 2500 to 8000, a hydroxyl number of between about 50 to 150 and an acid number of between 0 to 40; butylmethacrylate/hydroxyalkylacrylate copolymers with a hydroxyl number of between 50 to 200 or a meq of hydroxyl groups of about 1.0 to about 3.5 meq per gram of polymer solids; copolymers of ethyl, butyl, 2-ethylhexyl acrylate or methacrylate with styrene and a functional monomer such as acrylamide, hydroxyethyl or hydroxypropyl acrylate or methacrylate or optionally a carboxyl functional monomer such as acrylic or methacrylic acid or maleic acid.

Typical commercially available acrylic resins include ACRYLOID (trademarked product of Rohm & Haas Company) JONCRYL (trademarked product of Johnson Wax Company).

Polyester or alkyd resins prepared by the esterification of diols, triols, tetraols or higher functional polyols with a mono-, di- or poly-basic acid may also be used in accordance with the present invention. Nonlimiting examples of such mono-, di- or poly-basic acids useful in these embodiments of the present invention are the naturally derived saturated and unsaturated $C_{12}$ to $C_{18}$ fatty acids, the dimers or higher oligomers of such fatty acids, the ortho, meta, or para phthalic acids, the aliphatic dicarboxylic acids such as succinic, glutaric, adipic, maleic, fumaric, sebasic, or dodecanoic acid, or higher functional acids such as trimellitic acid. The polyols typically are ethylene glycol, propylene glycol, 1,3-butylene glycol, 1,4-butylene glycol, 1,6-hexane diol, neopentyl glycol, diethylene glycol, dipropylene glycol, cyclohexanedimethanol, glycerine, trimethylol ethane or propane pentaerythritol etc. The polyester or alkyd resins useful in the present invention preferably, but not necessarily, have a molecular weight of 400 to about 15,000, and a hydroxyl or carboxyl functionality of between about 0.2 to about 6 meq/g of resin solids, preferably between about 1 to 5 meq/g. Polyester resins derived from neopentylglycol, trimethylol, trimethylol propane, adipic and isophthalic acid with a molecular weight of between about 400 to 3000, a hydroxyl number of 340 to 10 or about 0.2 to 6 meq/g of resin solids, preferably 1 to 5 are especially preferred. Alkyd resins prepared from a non drying oil such as coconut oil with a triol, such as glycerine and phthalic anhydrides, as a dibasic acid are also preferred. The variety of polyester resins and alkyds commercially available is numerous and there is no restriction on their compositions as long as they have either hydroxyl or carboxyl functional groups.

Typical polyester resins are available commercially. These include CYPLEX polyester resins (Cytec Industries) AROPLAZ 6025 (trademarked product from Spencer Kellogg), K-FLEX 188 and 148 (King Industries)., CARGIL polyester polyols (Cargill Corporation) and CHEMPOL polyester polyols, (Cook Composites and Polymers).

Low to higher molecular weight epoxy resins derived from bisphenol A bisphenol F or epichlorohydrin are also contemplated for use in accordance with the present invention. Such resins have a molecular weight of about 800 to 10,000 preferably between about 1,000 to 5,000 and have, besides epoxy groups, hydroxyl functional groups. Examples of such resins include EPON from Hexion, DER from Dow Chemical Corporation, Araldite from Huntsman Corporation.

Vinyl polymers such as copolymers of vinylacetate with vinylchloride with a hydroxyl functional monomer. Commercially available vinyl resins may include VACH, VROH, VYES (Dow).

In addition to esters of unsaturated monocarboxylic acids, there may be employed the mono- or diesters of unsaturated dicarboxylic acids, such as maleic acid, fumaric acid and itaconic acid, in which at least one of the esterifying groups is hydroxyalkyl. Such esters include bis(hydroxyalkyl) esters, as well as various other alkylene glycol esters of such acids and mixed alkyl hydroxyalkyl esters, such as butyl hydroxyethyl maleate and benzyl hydroxypropyl maleate. The corresponding monoesters, such as the mono(hydroxyethyl), mono(hydroxypropyl), and similar alkylene glycol monoesters of maleic acid and similar acids, can also be used, and for some purposes are preferred.

The monomer or monomers with which the hydroxyalkyl ester may be interpolymerized can be any ethylenic compound copolymerizable with the ester, the polymerization taking place through the ethylenically unsaturated linkages. These include, but are not limited to, monoolefinic and, in minor amounts, polyolefinic hydrocarbons, halogenated monoolefinic and diolefinic hydrocarbons, unsaturated esters of organic and inorganic acids, esters or amides of unsaturated acids, nitriles, unsaturated acids, and the like. Nonlimiting examples of such monomers include styrene; 1,3-butadiene; 2-chlorobutene; acrylonitrile; alpha-methylstyrene; alpha-chlorostyrene; 2-chlorobutadiene; 1,1-dichloroethylene; vinyl butyrate; vinyl acetate; vinyl chloride; allyl chloride; dimethyl maleate; divinyl benzene; diallyl itaconate; triallyl cyanurate; and the like. The preferred monomers are acrylates and methacrylates, such as ethyl acrylate, propyl acrylate, ethylhexyl acrylate, acrylamide, methyl methacrylate, butyl methacrylate, and the like, as well as methacrylic and acrylic acid and mixtures thereof.

Another important class of thermosetting acrylic resins that may be employed in embodiments of the present invention comprises those that comprise the crosslinking carboxyl-containing polymers. The thermosetting carboxyl polymers that may be used herein consist generally of acrylic resins or modified acrylic resins containing from about 3 to about 40 percent by weight of ethylenically unsaturated acid.

Acrylic materials which may be used include acrylates, such as ethyl acrylate, butyl acrylate, and hexyl acrylate; methacrylates, such as methyl methacrylate, isopropyl methacrylate, acrylonitrile, and hexyl methacrylate; maleate esters, such as dibutyl maleate; and fumarates, such as ethyl fumarate.

The ethylenically unsaturated acids that can be used are those such as acrylic acid, methacrylic acid, fumaric acid, maleic acid, and itaconic acid.

It should be understood by those skilled in the art that one may also employ as the active hydrogen-containing resin hydroxy functional vinyl resins or hydroxy functional alkyd resins which are well known to those skilled in the art. These resins can readily be prepared by art-recognized methods.

All of the above described curable polyols require a crosslinking agent to cure to a durable film. The crosslinking agent used with the above-described polyols is selected from the group consisting of aminoplast resins and phenoplast resins, with the aminoplast resins being preferred.

Aminoplast resins are based on the addition products of formaldehyde, with an amino- or amido-group carrying substance. Condensation products obtained from the reaction of alcohols and formaldehyde with melamine, urea or benzoguanamine are most common and preferred herein. However, condensation products of other amines and amides can also be employed, for example, aldehyde condensates of triazines, diazines, triazoles, guanadines, guanamines and alkyl- and aryl-substituted derivatives of such compounds, including alkyl- and aryl-substituted ureas and alkyl- and aryl-substituted melamines. Some examples of such compounds are N,N'-dimethyl urea, benzourea, dicyandimide, formaguanamine, acetoguanamine, glycoluril, ammeline, 2-chloro-4,6-diamino-1,3,5-triazine, 6-methyl-2,4-diamino-1,3,5-triazine, 3,5-diaminotriazole, triaminopyrimidine, 2-mercapto-4,6-diaminopyrimidine, 3,4,6-tris(ethylamino)-1,3,5-triazine, and the like.

While the aldehyde employed is most often formaldehyde, other similar condensation products can be made from other aldehydes, such as, but not limited to, acetaldehyde, crotonaldehyde, acrolein, benzaldehyde, furfural, glyoxal and the like.

The aminoplast resins contain methylol or similar alkylol groups, and in most instances at least a portion of these alkylol groups are etherified by a reaction with an alcohol to provide organic solvent-soluble resins. Any monohydric alcohol can be employed for this purpose, including such alcohols as methanol, ethanol, propanol, butanol, pentanol, hexanol, heptanol and others, as well as benzyl alcohol and other aromatic alcohols, cyclic alcohol such as cyclohexanol, monoethers of glycols such as Cellosolves and Carbitols, and halogen-substituted or other substituted alcohols, such as 3-chloropropanol and butoxyethanol. The preferred aminoplast resins are substantially alkylated with methanol or butanol.

The phenolic resins which may be used as curing agents herein are formed by the condensation of an aldehyde and a phenol. The most used aldehyde is formaldehyde, although other aldehydes, such as acetaldehyde, can also be employed. Methylene-releasing and aldehyde-releasing agents such as paraformaldehyde and hexamethylene tetramine, can be utilized as the aldehyde agent if desired. Various phenols can be used; for instance, the phenol employed can be phenol per se, a cresol, or a substituted phenol in which a hydrocarbon radical having a straight chain, a branched chain or a cyclic structure is substituted for hydrogen in the aromatic ring. Mixtures of phenols are also often employed. Some specific nonlimiting examples of phenols utilized to produce these resins include p-phenylphenol, p-tert-butylphenol, p-tert-amylphenol, cyclopentylphenol and unsaturated hydrocarbon-substituted phenols, such as the monobutenyl phenols containing a butenyl group in ortho, meta or para position, and where the double bond occurs in various positions in the hydrocarbon chain. A common phenolic resin is phenol formaldehyde.

The ratio of the active hydrogen-containing resin to the crosslinking agent ranges from about 1:99 to about 99:1, preferably from about 1:9 to about 9:1.

In a preferred embodiment of the present invention a low molecular weight acrylic or polyester polyol is used as the active hydrogen-containing resin in conjunction with an at least partially methylated melamine-formaldehyde resin as aminoplast crosslinking agent.

In addition to the aforedescribed active hydrogen-containing resins, which cure by means of external crosslinking agent, the active hydrogen-containing resin can also be a resin capable of curing by means of internal crosslinking without the use of an external crosslinking agent; for example, polyol-containing acrylic resins which are interpolymers of carboxylic acid amides. These acrylic resins comprise interpolymers of an unsaturated carboxylic acid amide with at least one other monomer having a $CH_2$=C<group. These interpolymers are characterized in that they have amido hydrogen atoms replaced by the structure—$RCHOR_1$, wherein R is selected from the group consisting of hydrogen and saturated lower aliphatic hydrocarbon radicals and $R_1$ is a member of the class consisting of hydrogen and lower alkyl radicals with the proviso that the interpolymers have a hydroxyl number of at least 10. In general, these interpolymers can be produced in two ways.

In the first method, the unsaturated carboxylic acid amide chosen is an N-alkoxymethyl acrylamide (i.e., a material having an —$NHRCHOR_1$, group in the molecule). This N-alkoxymethyl acrylamide is then polymerized with at least one other monomer having a $CH_2$=C< group to produce a useful interpolymer. In the second method, an unsaturated carboxylic acid amide, e.g., acrylamide is polymerized with at least one other monomer having a $CH_2$=C< group and is then reacted with an aldehyde to form a useful interpolymer.

Nonlimiting examples of useful interpolymers and their methods of manufacture are disclosed in U.S. Pat. Nos. 2,978, 437; 3,037,963 and 3,079,434.

Among the monomers which may be polymerized with the unsaturated carboxylic acid amides are acrylates such as, but not limited to, methyl acrylate, ethyl acrylate, isobutyl acrylate, and hexyl acrylate; styrene, vinyl toluene, maleate esters, such as dibutyl maleate; acidic materials such as acrylic acid, methacrylic acid, and maleic anhydride; vinyl ethers; vinyl ketones; vinyl pyridines; allyl acetoacetates; glycidyl acrylates; methacrylamide; dimethylbenzyl methacrylate; hydroxy-substituted acrylics, such as hydroxyethyl acrylate; and the adducts of epsilon-caprolactone and hydroxyalkyl acrylates. In general, a preferred group of monomers includes ethyl acrylate, butyl acrylate, methyl acrylate, styrene, vinyl toluene, acrylonitrile, acrylic acid, monomethyl styrene and hydroxyethyl acrylate.

It has been found that preferred unsaturated carboxylic acid amide interpolymers are obtained when at least two monomeric compounds are interpolymerized with the N-alkoxymethylacrylamide-containing or the amide-containing material. In this manner, it is possible to tailor the interpolymer to have any desired degree of hardness or flexibility. For example, one useful ternary interpolymer is prepared from the acrylamide, hydroxyethyl acrylate and methyl methacrylate, this interpolymer then being reacted with an aldehyde to produce a material useful in this invention.

It is known that small amounts of methyl methacrylate tend to improve the hardness of multi-component interpolymers where one of the monomers is of the type which forms soft homopolymers. It has also been found that a small quantity of an acid monomer, such as acrylic acid, methacrylic acid, crotonic acid, maleic acid or fumaric acid, is particularly useful as an internal catalyst in that it imparts to the coating composition desirable fast curing properties. In place of acrylamide, any other polymerizable amide, for example methacrylamide or itaconic diamide, may be utilized.

The N-alkoxymethyl acrylamides useful in this invention are known in the art, and include such materials as N-alkoxymethyl acrylamides, N-alkoxymethyl methacrylamides, N-methyl-N-alkoxymethylacrylamides, and the like. Specific examples include N-butoxymethylacrylamide, N-isobutoxymethylacrylamide, N-(methoxyethoxymethyl) acrylamide, and hydroxymethylacrylamide.

Although it is not required, if desired, external crosslinking agent can be added to the aforesaid interpolymers.

According to another embodiment of the invention, the active hydrogen-containing resin comprises a silicone containing resin. The silicone containing resins that can be used as active hydrogen-containing resin include, for example, polysiloxanes. Non-limiting examples of polysiloxanes include linear, branched or cyclic polydimethylsiloxane; polysiloxanes having a hydroxyl group in the molecular chain such as silanol-terminated polydimethylsiloxane, diphenylsilanol-terminated polydimethylphenylsiloxane, carbinol-terminated polydimethylsiloxane, hydroxypropyl-terminated polydimethylsiloxane and polydimethylhydroxyalkylene oxide methylsiloxane; polysiloxanes having an amino group in the molecular chain such as bis(aminopropyldimethyl)siloxane, aminopropyl-terminated polydimethylsiloxane, aminoalkyl group-containing polydimethylsiloxane, dimethylamino-terminated polydimethylsiloxane and bis(aminopropyldimethyl)siloxane; polysiloxanes having a glycidoxyalkyl group in the molecular chain such as glycidoxypropyl-terminated polydimethylsiloxane, glycidoxypropyl-containing polyglycidoxypropylmethylsiloxane and a polyglycidoxypropylmethyldimethylsiloxane copolymer and polysiloxanes having functional groups which easily physically or chemically bond to a hydroxyl group on, for example, a silica surface, such as alkoxy, hydroxyl and amino groups. As such, the above polysiloxanes may be used alone or in combination.

The coating compositions of the present invention can be cured thermally; whereupon heating, the liberation of the free sulfonic acid catalyst occurs. The temperature utilized for cure of the claimed coating compositions varies widely depending upon the structure of the particular sulfonate ester; although usually temperatures between about 90° C. and about 400° C. The length of time required for cure can also vary with the structure of the particular sulfonate ester; but from about 10 sec. to about 60 minutes is typical. In coil coating applications, catalysts of this invention can be used to provide cure at peak metal temperatures ranging from 180° C. to 235° C. with cure times ranging from 10 sec to several minutes. This broad variation in cure time and temperature as a function of the structure of the catalyst is significant evidence of the claimed catalysts' versatility. As a result of the broad range of available materials which can be esterified with a sulfonic acid catalyst, one can readily prepare a catalyst to suit many particular needs.

The amount of catalyst added to the coating compositions of the present invention is, generally, a catalytic amount, that is that amount required to accelerate the reaction to a commercially acceptable rate. Generally, 0.1 to 5 percent by weight on resin solids, preferably 0.5 to 2 percent, is added.

The coating compositions of the present invention can contain, in addition to an active hydrogen-containing resin, curing agent, and catalyst, other components in amounts sufficient to enhance various properties of the composition or the final coating. Nonlimiting examples of such components include the addition of effective amounts of pigments, pigment stabilizers, rheology control agents, dispersants, adhesion-promoting agents, colorants, light stabilizers and the like, as are well known to those skilled in the art.

The coating compositions of this invention are useful for application on metallic substrates, such as steel or aluminum, and they can be applied with or without a primer. They can also be applied to other substrates, such as plastics and wood. The compositions can be applied in any conventional manner, such as, spray-, dip-, roll-, or brush-coating. The claimed coating compositions are especially useful for electrostatic spray application. This is because the blocked acid catalysts of the present invention are non-ionic compounds; hence, they do not hamper the electrostatic spray characteristics of the coating composition. After the substrate is electrostatically sprayed it is typically baked at a temperature of from about 100° C. to about 350° C. to form a cured coating.

The claimed coating compositions not only facilitate "single-container" packaging, but they also provide improved storage stability. In addition they can also provide such qualities as improved gloss, good flexibility, durability and/or chemical resistance.

Coating systems for automobiles normally comprise a multiplicity of coatings applied to a steel substrate. Typically, the steel is treated with a rust-proofing phosphate layer, and then a cathodic electrocoat primer for additional corrosion protection is applied. A primer-surfacer (also known as a chip resistant primer, primer, or primer filler) is used next to smooth the surface for topcoating and also to provide stone chipping resistance to the coating system during the normal course of driving. Then a top-coat system is applied, sometimes as a single colored coat, more often now as a basecoat with solid color or flake pigments followed by a transparent protective clear coat, to protect and preserve the attractive aesthetic qualities of the finish on the vehicle even on prolonged exposure to the environment or weathering.

Coating film formation of the basecoat and the clearcoat is normally achieved by wet-on-wet application, which is to say that the clearcoat is applied to the basecoat without baking the basecoat prior to clearcoat application (although the basecoat may be flash dried for a short period of time prior to clearcoat application), and then subsequently baking the basecoat and clearcoat at the same time to form a dried and cured finish. In the conventional method for forming the multi-layer coating film, the underlying primer surfacer layer, however, is baked before being topcoated with basecoat and clearcoat. Historically, baked primers have been used not only to provide a smooth surface on which to apply the topcoat, but also to also prevent interfacial bleeding or intermixing with the overlying basecoat and avoid disrupting the appearance of the overall topcoat finish. Resistance to intermixing (sometimes referred to as "strike-in" resistance) is especially important for the appearance of glamour metallic finishes which are very popular nowadays on automobiles and trucks. Any disturbance of the metallic pigment flake orientation in metallic basecoats after application over the primer-surfacer will detract from the metallic effect of the finish. Therefore, care must be taken to ensure that the metal pigment flakes are not disturbed after painting.

In recent years, it has also been strongly desired to reduce the environmental load or impact of automotive assembly plants by reducing VOC (volatile organic compounds) emissions and $CO_2$ (carbon dioxide) emissions generated from operating painting booths and baking ovens. This has led to use of lower solvent content in the paint and the development of three-layer wet paint systems, which make it possible to apply a primer surfacer, basecoat and clearcoat wet-on-wet continuously before they are cured all at once in a single bake. With this simplified application process, it is possible to eliminate the separate primer painting booth and primer oven, which also results in substantial cost savings to the automobile manufacturers. The technical hurdles of this process simplification, however, have been significant. For instance, interfacial bleeding and aesthetic appearance, as well as film properties, such as chip resistance are still significant concerns.

Therefore, there is still a need in the art to find a more effective way to prevent the inter-mixing of the primer surfacer and basecoat and clearcoat layers when applied in a wet on wet on wet (i.e., a 3 wet) manner and make it possible to eliminate the primer baking process and reduce the environmental impact of the coating system, while also maintaining film builds, the overall appearance such as high gloss and distinctness of image and film properties of the coating system.

For example, United States Published Patent Application No. 20070190312 describes a method of forming a multi-layer coating on automobile bodies without a primer bake, and catalysts of the current invention are especially useful in the primer, and base coat composition described, but still suffers from the above-described drawbacks.

Coil coatings are applied to coiled sheet metal stock, such as steel or aluminum, in an economical, high speed process. The coil coating process results in a high quality, uniform coating with little waste of the coating and little generation of organic emissions as compared to other coating methods, e.g. spray application of a coating composition.

Coil coating is a continuous feeding operation, with the end of one coil typically being joined (e.g., stapled) to the beginning of a next coil. The coil is first fed into an accumulator tower and after coating is fed into an exit accumulator tower, with the accumulator towers allowing the coating operation to continue at constant speed even when intake of the steel is delayed, for example to start a new roll, or winding of the steel after coating is delayed, for example to cut the steel to end one roll and begin a new roll. The coil is generally cleaned to remove oil or debris, pre-treated, primed with a primer on both sides, baked to cure the primer, quenched to cool the metal, and then coated on at least one side with a topcoat. A separate backer or a different topcoat may be applied on the other side. The topcoat is baked and quenched, then fed into the exit accumulator tower and from there is re-rolled.

One of the controlling factors for the coil coating line speed is the oven dwell time necessary to cure the applied coating at the cure oven temperature. A coating composition that can be cured in a shorter time at the oven temperature allows a faster and more economical coil coating process. A number of other properties are important for coil coatings, too, such as resistance to degradation on outdoor exposure (weatherability), chemical resistance, water resistance, scratch resistance, gloss, hardness, and resistance to delamination when the substrate is bent. The bending property is important because after being coated the metal is subjected to a forming step. For example, building panels are formed into a three-dimensional shape after coating. It is important that the coating not lose adhesion during the forming step or steps. Weatherability is important for metal that will be used for building panels, gutters, garage doors, sign stock, panels used for vehicle parts, or other such uses where the coated surface is exposed to outdoor weather and sun. While the bending property is generally better with softer, more flexible binders, weatherability and other durability properties are generally better with harder binders.

Various coil coating compositions have been proposed to be suitable for the coil coatings process and provide the different coating properties desired. For example, Heyenk et al., U.S. Pat. No. 6,413,648 describes a thermosetting coating composition containing a mixture of two polymers, one of which is amorphous with a glass transition temperature greater than about 45° C. The polymers may be linear or branched polyacrylates or polyesters. Tachika et al., U.S. Pat. No. 5,563,223 describes a composition that states that it balances the need for processability of the coating composition with the need for alkali resistance, gasket resistance, weatherability and resistance to staining in the cured coating. The composition contains a curing agent and a polyester prepared using an acid component that is at least 50 mole % aromatic dicarboxylic acid and a glycol component having 1-25 mole % 2-methyl-1,3-propanediol and 75-99 mole % alkylene glycol having 5 to 10 carbon atoms. Alternatively, the glycol component can be 20-85 mole % of alicyclic glycol, 80-15 mole % of the addition product of bisphenol A and alkylene oxide, and up to 50 mole % of other glycol(s). Sullivan, U.S. Pat. No. 5,380,816 discloses thermoset coating compositions containing linear polyesters consisting essentially of recurring units of isophthalic acid, an aliphatic diol component including 2-methyl-1,3-propanediol, and, optionally a further dicarboxylic acid. The cured coatings reportedly have improved flexibility and hardness, although it requires a cure time that is comparatively long for a coil coating. Toman et al., U.S. Pat. No. 4,968,775 discloses a thermosetting coil coating composition containing an aminoplast resin and a polyester prepared by condensation of 2-methyl-1,3-propanediol, neopentyl glycol, isophthalic acid, and terephthalic acid, and may contain 1,6-hexanediol or other symmetrical glycol, trimethylolpropane, adipic acid or other symmetrical aliphatic dicarboxylic acid, and/or trimellitic anhydride. The Toman composition is reportedly particularly resistant to crystallization. Yamada et al., U.S. Pat. No. 4,734,467 discloses a coil coating composition consisting essentially of a crosslinking component selected from melamine resin or isocyanate compound and a mixture of linear and branched polyester resins. The cured coating is reported to have desirable hardness, bending, processability, fastness to boiling water, weather resistance, chemical resistance, and marker stain resistance. Algrim et. al. U.S. Pat. No. 6,897,265 discloses a coil coating composition producing a coil coating with excellent properties at a lower peak metal temperature includes (a) a first, branched polyester prepared by condensation of a polyol component consisting essentially of a flexibilizing diol, 2-methyl-1,3-propanediol, and a polyol having at least three hydroxyl groups and an acid component consisting essentially of isophthalic acid; (b) a second, essentially linear polyester prepared by condensation of a polyol component consisting essentially of a flexibilizing diol and 2-methyl-1,3-propanediol and an acid component consisting essentially of isophthalic acid; and (c) a crosslinking agents including, aminoplasts and isocyanates.

These attempts in the prior art focused on adjusting the coating in order to provide lower temperature cure in order to prevent discoloration. However, these coatings still suffered from other drawbacks of the prior art including popping, amine migration and discoloration. The changing of the polymer chemistry did not address the problems with the catalyst.

Coil coatings are typically cured through short dwell times in an oven to reach a desired peak metal temperature (PMT). The temperature of the oven is usually significantly higher than the desired peak metal temperature to shorten the necessary dwell time. The coil coating compositions of the current invention, however, advantageously are sufficiently cured at a peak metal temperature of about 180° C. to about 262° C. to develop the desired coil coating properties, although they are robust enough to be curable at temperatures as high as 280° C. without significant decrease in coating properties. The coating composition of the invention is applied by a coil coating process to a metal coil stock. Suitable metal coil stock includes, for example and without limitation, steel, tin-plated steel, and aluminum. The coating composition of the invention is preferably a topcoat, and is applied to the coil stock following application of a primer layer. The coating composition could also be applied as a single coat without a separate primer layer, which may be done for example for aluminum. The coating composition could also be formulated as a primer composition, e.g., by using pigments typical of primers and additives e.g. for adhesion. The coating composition could also be applied as a "backer" coating, a coating applied to the back or reverse side of a coil. The applied coating is cured to provide a cured coil coating on the metal coil.

Environmental concerns about the use of Cr (VI) compounds in anti-corrosion coating technology has resulted in the introduction and use of EHS-compliant products, such as calcium-modified silica gel anti-corrosive pigments, especially in the general industrial and coil coatings segment. This has been a continuous and slow process but has been gaining great momentum in the last few years. The pressure on the European coatings industry towards implementation of VOC-free and EHS-compliant technologies significantly increased with the announcement of the EU VOC legislation that comes into effect in 2007 and the new EU-chemical legislation that is currently planned to become effective around 2008 to 2010. The target of the latter legislation is to ban all chemicals that may be considered as hazardous (approximately 20% of all chemicals used in the coatings industry). In response to this ever-increasing environmental pressure, producers of anti-corrosion primers are currently actively testing alternatives to anti-corrosive materials based on Cr(VI) and Zn compounds.

Calcium-modified silica gel anti-corrosive pigments (Ca/Silica pigments) offer a suitable, environmentally compliant alternative when considering future legislation changes. These pigments are non-toxic, heavy-metal-free, micronized, amorphous particles of controlled particle size distribution. The density of these pigments is about 1.8 g/cm$^3$, which is quite low compared to conventional pigments. They also have a moderately alkaline reaction with water as indicated by the pH of aqueous slurry, which lies in the region of 9-10. The manufacturing process involves an ion-exchange reaction at the surface of silica gel between weakly acidic surface silanol groups and calcium hydroxide.

Coil primer formulations, in addition contain acidic substances in the form, for example, of resins bearing acidic groups or amine blocked conventional acid catalysts or latent acid catalysts containing a beta-hydroxyl group. In these cases, acid-base interactions can lead to viscosity instability or reduced cure rates. Latent acid catalysts containing beta-hydroxyl group are more prone to inter molecular alkylation reaction leading to the liberation of free sulfonic acid upon storage. The slow release of free sulfonic acid is responsible for the detrimental interaction with basic components present in the formulation. In many cases, this can be overcome by adjusting paint formulations with special additives, such as viscosity-control additives, use of co-catalysts or use of pigments and inhibitive pigments having acidic surface sites. In other cases, pigments having lower calcium content may be desirable to help minimize the basicity of the Ca/Silica pigments surface, but at the same time, anti-corrosive performance should be maintained.

Catalysts of the present invention are stable upon oven aging at 50° C., with no increase in acid value and no loss in cure efficiency after four weeks exposure to elevated temperatures. Typically amine and epoxy blocked acids will dissociate to generate free acid upon oven aging and consequently affect the extended storage stability of the formulation.

Shieldex C-303, a calcium based anti corrosive pigment (W. R. Grace) and Pigmentan 465M, an oxyaminophosphate salt of magnesium are excellent non-chrome substitutes for strontium and other chromate compounds and were designed to replace strontium chromate in coil primers. Unfortunately this pigment interacts with most known acid catalysts (amine and epoxy blocked) and reduces the cure response. Grace recommends the use of a combination of a silane ester, epoxy blocked phosphoric acid, epoxy blocked sulfonic acid and a dicarboxylic acid at up to a 9.76% loading to prevent the interaction of the basic Shieldex pigment and to provide acceptable cure response. The blocked sulfonate esters derived from aromatic sulfonic acids of the present invention and especially the ones derived from dinonyl naphthalene disulfonic acid (DNNDSA), at 3.8% provided outstanding cure, viscosity stability upon oven aging, and corrosion/salt spray resistance. In addition to resistance to basic pigment deactivation, these catalysts reduce solvent popping defects and provide excellent adhesion/intercoat adhesion while allowing extended storage of formulated coating.

In addition, the deblocking profile of these sulfonate esters of the present invention, provides the so called snap cure at the desired temperatures and are beneficial in reducing solvent popping/blistering, seen in coil applications with epoxy, and amine blocked catalysts.

The following examples are submitted for the purpose of further illustrating the nature of the present invention and should not be construed as a limitation on the scope thereof. All parts and percentages in the Examples and throughout the specification are by weight unless otherwise indicated.

EXAMPLES

Preparation of Sulfonate Esters

The sulfonate esters can be made in any of the ways known to those skilled in the art. For example, several esters based on didodecyl naphthalene sulfonic acid (DDDNSA), dinonyl naphthalene sulfonic acid (DNNSA), dodecyl benzene sulfonic acid (DDBSA), dinonyl naphthalene disulfonic acid (DNNDSA), toluene sulfonic acid (p-TSA) and methane sulfonic acid (MSA) were prepared for use in the practice of the present invention.

The following Examples (1-76) presented in Tables A-F, respectively, of the esters were synthesized using well known methods known to those skilled in the art.

Esters Based on Didodecyl Naphthalene Sulfonic Acid (DDDNSA)

TABLE A

| Example | Sulfonic acid Component | Alkyl Ester Component |
|---|---|---|
| 1 | Didodecyl naphthalene sulfonic acid | Cyclohexyl |
| 2 | Didodecyl naphthalene sulfonic acid | Hexyl |
| 3 | Didodecyl naphthalene sulfonic acid | Bis-hexylene |
| 4 | Didodecyl naphthalene sulfonic acid | Dodecyl |
| 5 | Didodecyl naphthalene sulfonic acid | Octyl |
| 6 | Didodecyl naphthalene sulfonic acid | Decyl |
| 7 | Didodecyl naphthalene sulfonic acid | Tetradecyl |
| 8 | Didodecyl naphthalene sulfonic acid | Hexadecyl |
| 9 | Didodecyl naphthalene sulfonic acid | Octadecyl |
| 10 | Didodecyl naphthalene sulfonic acid | 1-methyl-4-(1-methylethenyl)-Cyclohexyl |
| 11 | Didodecyl naphthalene sulfonic acid | Bicyclo-(2.2.1)-hepta-2,5-diyl |
| 12 | Didodecyl naphthalene sulfonic acid | Bicylo-[3,3,0]-oct-1-yl |
| 13 | Didodecyl naphthalene sulfonic acid | Norbornyl |
| 14 | Didodecyl naphthalene sulfonic acid | Bis dicyclopentyl |

Esters Based on Dodecyl Benzene Sulfonic Acid (DDBSA)

TABLE B

| Example | Sulfonic acid Component | Alkyl Ester Component |
|---|---|---|
| 15 | Dodecyl benzene sulfonic acid | Cyclohexyl |
| 16 | Dodecyl benzene sulfonic acid | Hexyl |
| 17 | Dodecyl benzene sulfonic acid | Bis-hexylene |
| 18 | Dodecyl benzene sulfonic acid | Dodecyl |
| 19 | Dodecyl benzene sulfonic acid | Octyl |
| 20 | Dodecyl benzene sulfonic acid | Decyl |
| 21 | Dodecyl benzene sulfonic acid | Tetradecyl |
| 22 | Dodecyl benzene sulfonic acid | Hexadecyl |
| 23 | Dodecyl benzene sulfonic acid | Octadecyl |
| 24 | Dodecyl benzene sulfonic acid | 1-methyl-4-(1-methylethenyl)-Cyclohexyl |
| 25 | Dodecyl benzene sulfonic acid | Bicyclo-(2.2.1)-hepta-2,5-diyl |
| 26 | Dodecyl benzene sulfonic acid | Bicylo-[3,3,0]-oct-1-yl |
| 27 | Dodecyl benzene sulfonic acid | Norbornyl |
| 28 | Dodecyl benzene sulfonic acid | Bis dicyclopentyl |

Esters Based on Dinonyl Naphthalene Sulfonic Acid (DNNSA)

TABLE C

| Example | Sulfonic acid Component | Alkyl Ester Component |
|---|---|---|
| 29 | Dinonyl naphthalene sulfonic acid | Cyclohexyl |
| 30 | Dinonyl naphthalene sulfonic acid | Hexyl |
| 31 | Dinonyl naphthalene sulfonic acid | Bis-hexylene |
| 32 | Dinonyl naphthalene sulfonic acid | Dodecyl |
| 33 | Dinonyl naphthalene sulfonic acid | Octyl |
| 34 | Dinonyl naphthalene sulfonic acid | Decyl |
| 35 | Dinonyl naphthalene sulfonic acid | Tetradecyl |
| 36 | Dinonyl naphthalene sulfonic acid | Hexadecyl |
| 37 | Dinonyl naphthalene sulfonic acid | Octadecyl |
| 38 | Dinonyl naphthalene sulfonic acid | 1-methyl-4-(1-methylethenyl)-Cyclohexyl |
| 39 | Dinonyl naphthalene sulfonic acid | Bicyclo-(2.2.1)-hepta-2,5-diyl |
| 40 | Dinonyl naphthalene sulfonic acid | Bicylo-[3,3,0]-oct-1-yl |
| 41 | Dinonyl naphthalene sulfonic acid | Norbornyl |
| 42 | Dinonyl naphthalene sulfonic acid | Bis dicyclopentyl |

Esters Based on Dinonyl Naphthalene Disulfonic Acid (DNNDSA)

TABLE D

| Example | Sulfonic acid Component | Alkyl Ester Component |
|---|---|---|
| 43 | Dinonyl naphthalene disulfonic acid | Hexyl |
| 44 | Dinonyl naphthalene disulfonic acid | Bis-hexylene |
| 45 | Dinonyl naphthalene disulfonic acid | Dodecyl |
| 46 | Dinonyl naphthalene disulfonic acid | Octyl |
| 47 | Dinonyl naphthalene disulfonic acid | Decyl |
| 48 | Dinonyl naphthalene disulfonic acid | Tetradecyl |
| 49 | Dinonyl naphthalene disulfonic acid | Hexadecyl |
| 50 | Dinonyl naphthalene disulfonic acid | Octadecyl |
| 51 | Dinonyl naphthalene disulfonic acid | 1-methyl-4-(1-methylethenyl)-Cyclohexyl |
| 52 | Dinonyl naphthalene disulfonic acid | Bicyclo-(2.2.1)-hepta-2,5-diyl |
| 53 | Dinonyl naphthalene disulfonic acid | Bicylo-[3,3,0]-oct-1-yl |

Esters Based on Methane Sulfonic Acid (MSA)

TABLE E

| Example | Sulfonic acid Component | Alkyl Ester Component |
|---|---|---|
| 54 | Methane sulfonic acid | Hexyl |
| 55 | Methane sulfonic acid | Dodecyl |
| 56 | Methane sulfonic acid | Octyl |
| 57 | Methane sulfonic acid | Decyl |
| 58 | Methane sulfonic acid | Tetradecyl |
| 59 | Methane sulfonic acid | Hexadecyl |
| 60 | Methane sulfonic acid | Octadecyl |
| 61 | Methane sulfonic acid | Norbornyl |
| 62 | Methane sulfonic acid | Bicylo-[3,3,0]-oct-1-yl |
| 63 | Methane sulfonic acid | Bis dicyclopentyl |

Esters based on toluene sulfonic acid (pTSA)

TABLE F

| Example | Sulfonic acid Component | Alkyl Ester Component |
|---|---|---|
| 64 | Toluene sulfonic acid | Cyclohexyl |
| 65 | Toluene sulfonic acid | Hexyl |
| 66 | Toluene sulfonic acid | Bis-hexylene |
| 67 | Toluene sulfonic acid | Dodecyl |
| 68 | Toluene sulfonic acid | Octyl |
| 69 | Toluene sulfonic acid | Decyl |
| 70 | Toluene sulfonic acid | Tetradecyl |
| 71 | Toluene sulfonic acid | Hexadecyl |
| 72 | Toluene sulfonic acid | Octadecyl |
| 73 | Toluene sulfonic acid | 1-methyl-4-(1-methylethenyl)-Cyclohexyl |
| 74 | Toluene sulfonic acid | Bicyclo-(2.2.1)-hepta-2,5-diyl |
| 75 | Toluene sulfonic acid | Bicylo-[3,3,0]-oct-1-yl |
| 76 | Toluene sulfonic acid | Norbornyl |
|  | Toluene sulfonic acid | Bis dicyclopentyl |

Cure Study in a Pe/Melamine System

A commercially available polyester resin (69.31 wt. %) was blended with a hexamethoxymethylmelamine resin (29.70 wt. %). The mixture was catalyzed with catalysts of the present invention to deliver 0.7 meq/g of acid calculated on the basis of the starting acid. Comparative formulations were catalyzed with epoxide blocked analogs of the corresponding acids to deliver equivalent levels of catalyst. Curing was carried out at 121° C., 135° C. and 150° C. for 20 minutes on iron phosphate pretreated steel substrate. The degrees of cure for each catalyst system were determined by the pendulum hardness, pencil hardness and MEK double rubs. The results of this study are shown on Table 1.

TABLE 1

| Catalyst (Wt. %) | Temp., ° C. | Pendulum Hardness, cycles | Pencil Hardness | 2X MEK Rubs |
|---|---|---|---|---|
| Ex. 7 (1.9%) DDDNSA/tetradecyl ester | 121 | 10 | <2B | 2 |
| | 135 | 27 | HB-F | 2 |
| | 150 | 114 | H-2H | 100 |
| Ex. 21 (0.95%) DDBSA tetradecyl ester | 121 | 6 | <2B | 5 |
| | 135 | 35 | HB-F | 10 |
| | 150 | 109 | H-2H | 100 |
| Ex. 7a* (0.95%) DDDNSA/epoxy adduct with EPON 828 | 121 | 66 | F-H | 45 |
| | 135 | 98 | H-2H | 95 |
| | 150 | 122 | H-2H | 100 |
| Ex. 21a* (0.95%) DDBSA/epoxy adduct with EPON 828 | 121 | 110 | F-H | 100 |
| | 135 | 119 | H-2H | 100 |
| | 150 | 121 | H-2H | 100 |

*Prepared by the reaction of the corresponding sulfonic acids with an epoxide to yield the beta hydroxyl ester analog.

Comparison of the catalysts of the present invention with the epoxy blocked analogs indicates a much sharper cure response with no apparent cure at lower cure temperatures (121° C. and 135° C.) and a rapid cure at 150° C. The epoxy blocked analogs showed more significant cure at all temperatures. The lack of cure at lower temperatures provides the formulations containing the catalysts of the present invention with more open time thus allowing the solvents in the formulation to escape and resulting in much less popping.

Cure Studies in a White Pe Enamel

A standard white coil paint formula based on Rheichold's Aroplaz 6126-65 polyester and HMMM was formulated as below in Table G. All formulations used in this study were made from this white master batch with the addition of the appropriate catalysts package.

TABLE G

| Ingredients | White master batch formula | Component Type |
|---|---|---|
| Aroplaz 6126-z-65 | 42.47 | High MW PE resin |
| Aromatic150 | 10.34 | Solvent |
| EEP | 9.71 | Solvent |
| Tiona 472 | 32.13 | Titanium dioxide |
| Disparlon L-1984 | 0.53 | Flow-and-leveling agent |
| Resimene 747 | 4.82 | Melamine Crosslinker |
| Total | 100.00 | |

All formulations were applied by the drawdown method to B-1000 steel panels, with an average dry film thickness of approximately 1.0 mil. Films were cured in a coil oven at desired cure temperature/time, to provide appropriate peak metal temperatures. Cure properties were measured using double MEK rubs.

In the first study a new blocked sulfonic acid of the present invention was compared with its amine blocked and epoxy blocked counterparts at equivalent acid levels of 1.3% at an oven temperature of 300° C. for 25, 30, and 35 seconds, respectively. The corresponding peak metal temperatures were 228° C., 241° C., and 250° C. The results of this study are presented in Table 2.

Cure Response of DDDNSA Adducts

TABLE 2

| Catalyst (weight %) | MEK DR 300° C./25 sec. PMT 228° C. | MEK DR 300° C./30 sec. PMT 241° C. | MEK DR 300° C./35 sec. PMT 250° C. |
|---|---|---|---|
| Ex. 4 (1.35%) | 4 | 58 | 100 |
| Ex. 7a* (1.35%) DDDNSA/epoxy adduct | 14 | 100 | 100 |
| Ex. 7b** (1.35%) DDDNSA/amine adduct using 2-Amino-2-methyl-1-propanol (AMP) | 88 | 98 | 100 |

*Prepared by the reaction of the corresponding sulfonic acids with an epoxide to yield the beta hydroxyl ester analog..
**Prepared as the amine adduct.

Comparison of the catalysts of the current invention with the epoxy, and amine blocked analogs indicates a much sharper cure response with no apparent cure at lower peak metal temperature (PMT) (228° C.) and a rapid cure at a higher PMT (250° C.). The epoxy blocked analog and amine blocked analog showed more significant cure at lower peak metal temperatures. The lack of cure at lower PMT provides the formulations containing the catalysts of the current invention with more open time thus allowing the solvents in the formulation to escape resulting in much less popping.

Popping Resistance

A popping tendency study of the presently claimed acid catalyst, i.e., Ex. 21 was performed and compared to an amine blocked acid catalyst, using an oven temperature of 435° C. at 15 seconds, which corresponded to a peak metal temperature of 240° C. A small amount of Pthalo blue tint paste was added for this part of the study to improve the visual impact of the blistering. The results are presented in FIG. 1. The results show no blistering in the composition using the presently claimed catalyst.

Color Development on Overbake

In the same study Yellowness Index (YI) measurements were made after 3 bake cycles (350° C./30 seconds), comparing the performance of presently claimed acid catalyst, i.e., Ex. 21, with the corresponding amine blocked version. The catalyst of the current invention being amine free led to the lowest YI value compared to the amine blocked variant the resulted are displayed in Table H.

TABLE H

| CATALYST | $1^{ST}$ BAKE | $2^{ND}$ BAKE | $3^{RD}$ BAKE | DELTA |
|---|---|---|---|---|
| Amine Blocked DDBSA Catalyst | −1.21 | −0.43 | −0.73 | 0.48 |
| New Acid Catalyst of Ex. 21 | −2.91 | −2.71 | −2.77 | 0.14 |

Evaluation in an Anticorrosive Coil Primer System Containing Shieldex C-303

A master batch of the white Shieldex 303 coil primer system was prepared, as given below (see Table I) without any catalyst for use in our evaluations. All formulations used in this study were made from this white master batch with the addition of the appropriate catalysts package.

TABLE I

| Ingredients | White master batch formula |
|---|---|
| Dynapol L205, High MW Polyester Resin (30% Solution)* | 55.06 |
| Dynapol L208, High MW Polyester Resin (30% Solution)* | 13.76 |
| Solvesso 150 Solvent | 6.19 |
| Dibasic Ester Solvent (DBE) | 4.82 |
| Diacetone Alcohol, Solvent | 2.75 |
| Silane A187 | 0.72 |
| Epoxy Blocked Phosphoric Acid | 0.00 |
| Halox 650 (Dicarboxylic Acid) | 0.00 |
| Shieldex C 303 (Anti Corrosive Pigments) | 7.23 |
| Tiona 472, $TiO_2$ | 3.21 |
| Talc IT Extra | 1.51 |
| Cymel 350, Melamine Crosslinker | 4.75 |
| Epoxy Blocked DDBSA | 0.00 |
| Total | 100.00 |

For comparison purposes, control formulations with the catalysts of the current state of the art (by W. R. Grace) namely epoxy blocked DDBSA, and epoxy blocked phosphoric acid were prepared as follows (see Table J).

TABLE J:

| Ingredients | Control Formula |
|---|---|
| Dynapol L205, High MW Polyester Resin (30% Solution) | 50.04 |
| Dynapol L208, High MW Polyester Resin (30% Solution) | 12.51 |
| Solvesso 150 Solvent | 5.63 |
| Dibasic Ester Solvent (DBE) | 4.38 |
| Diacetone Alcohol Solvent | 2.50 |
| Silane A187 | 0.65 |
| Epoxy Blocked Phosphoric Acid | 6.28 |
| Halox 650 (Dicarboxylic Acid) | 1.40 |
| Shieldex C 303 (Anticorrosive Pigment) | 6.57 |
| Tiona 472, $TiO_2$ | 2.92 |
| Talc IT Extra | 1.37 |
| Cymel 350, Melamine Crosslinker | 4.32 |
| Epoxy Blocked DDBSA | 1.52 |
| Total | 100.09 |

Acid catalysts evaluated in this study include DNNDSA ester Ex. 51 of the current invention and the corresponding amine and epoxy blocked variants. Ex. 51a* and 51b** were prepared in order to produce the corresponding amine and epoxy adduct, respectively.

All formulations were applied by the drawdown method to B-1000 steel panels, with average dry film thickness ranging from approximately 0.5-0.75 mils. Films were cured in a coil oven for 25 seconds at 325° C. using a cure schedule which provided a "peak metal temperature" of approximately 230-235° C. The following properties were evaluated with the cured panels.

Pendulum hardness
Gloss (20/60 degrees)
Color (Yellowness Index)
Adhesion (Direct to B-1000 & Recoated)
Salt Spray Resistance (500 Hours)
Humidity Resistance (1000 Hours)
50° C. Oven Aging (7, 14, 21 & 28 Days—Viscosity, MEK Resistance & Hardness)

The results are presented in Tables 3-5.

TABLE 3

White Shieldex C 303 Control formula with & without catalysts

| Ingredients | Control Formula | Control Formula - No Catalysts |
|---|---|---|
| Dynapol L205, High MW Polyester Resin (30% Solution) | 50.04 | 55.06 |
| Dynapol L208, High MW Polyester Resin (30% Solution) | 12.51 | 13.76 |
| Solvesso 150, Solvent | 5.63 | 6.19 |
| Dibasic Ester Solvent (DBE) | 4.38 | 4.82 |
| Diacetone Alcohol, Solvent | 2.50 | 2.75 |
| Silane A187 | 0.65 | 0.72 |
| Epoxy Blocked Phosphoric Acid | 6.28 | 0.00 |
| Halox 650 (Dicarboxylic Acid) | 1.40 | 0.00 |
| Shieldex C 303 (Anticorrosive Pigment) | 6.57 | 7.23 |
| Tiona 472, $TiO_2$ | 2.92 | 3.21 |
| Talc IT Extra | 1.37 | 1.51 |
| Cymel 350, Melamine Crosslinker | 4.32 | 4.75 |
| Epoxy Blocked DDBSA | 1.52 | 0.00 |
| Total | 100.09 | 100.00 |
| Cure Schedule - 25"@ 325° C./PMT - 232° C. | | |
| ADFT - Mils | 0.56 | 0.53 |
| Gloss - 20/60 | 0.9/6.4 | 5.7/37.7 |
| Hardness - Pendulum/Pencil | 76 | 83 |
| Impact - Forward/Reverse | 160+/160+ | |
| MEK - 2X Rubs | 75 - Marring | 2 |
| % Adhesion/Recoated | 100/100 | |
| Color - Y. Index | −7.74 | −8.37 |
| Over Bake - 25" @ 325° C. | | |
| Color - Y. Index | −7.04 | −8.14 |
| 50° C. Oven Aging Study - 21 Days | | |
| Initial Viscosity* | 430 cPs | 1510 cPs |
| Viscosity - 7 Days/MEK Rubs | 572/75** | 1470/2 |
| Viscosity - 14 Days/MEK Rubs | 690/75** | 1320/2 |
| Viscosity - 21 Days/MEK Rub | 690/50** | 1210 |

TABLE 4

Catalysts study on Shieldex C 303 White Coil Primer System

| | | | |
|---|---|---|---|
| Dynapol L205, High MW Polyester Resin (30% Solution) | 55.06 | 55.06 | 55.06 |

TABLE 4-continued

Catalysts study on Shieldex C 303 White Coil Primer System

| | | | |
|---|---|---|---|
| Dynapol L 208, High MW Polyester Resin (30% Solution) | 13.76 | 13.76 | 13.76 |
| Solvesso 150, Solvent | 6.19 | 6.19 | 6.19 |
| Dibasic Ester - Solvent | 4.82 | 4.82 | 4.82 |
| Diacetone Alcohol - Solvent | 2.75 | 2.75 | 2.75 |
| Silane A187 | 0.72 | 0.72 | 0.72 |
| Shieldex C303 | 7.23 | 7.23 | 7.23 |
| Tiona 472, TiO$_2$ | 3.21 | 3.21 | 3.21 |
| Talc IT Extra | 1.51 | 1.51 | 1.51 |
| Cymel 350, Melamine Crosslinker | 4.75 | 4.75 | 4.75 |
| Total White Base | 100.00 | 100.00 | 100.00 |
| Catalyst of Ex. 51A | 1.524 | 0.00 | 0.00 |
| Catalyst of Ex. 51 | 0.00 | 3.81 | 0.00 |
| Catalyst of Ex. 51B | 0.00 | 0.00 | 1.524 |
| Cure Schedule 25" @ 325° C. | | | |
| ADFT - Mils | 0.54 | 0.51 | 0.59 |
| Gloss - 20/60 | 5.2/36.3 | 0.42/31.4 | 2.5/20.5 |
| Hardness - Pendulum/Pencil | 84/H-2H | 90/H-2H | 79/H-2H |
| MEK - 2X Rubs | 10 | 75 | 30 |
| Impact - Forward/Rev | 160+/160+ | 160+/160+ | 160+/160+ |
| Adhesion - % Loss | 0 | 0 | 0 |
| Recoat Adhesion - % Loss | 0 | 0 | 0 |
| Color - Yellow Index Over Bake - 25" @ 325° C. | −7.89 | −8.32 | −7.95 |
| Color - Yellow Index 50° C. Oven Aging | −7.74 | −8.10 | −7.55 |
| Viscosity/MEK 2X Rub | | | |
| Initial Viscosity - cPs* | 910 | 975 | 625 |
| 7 Days | 1040/10 | 990/75 | 870/15 |
| 14 Days | 995/3 | 830/40-55 | 940/5 |
| 21 Days | 1010/4 | 780/40-55 | 880/5 |

The above results clearly show that when a fairly high loading (9.7%) of the catalyst package consisting of two different epoxy blocked acids (current state of the art) were replaced by 3.8% of a DNNDSA based catalyst Ex. 51 of the present invention, comparable cures and superior cure after several weeks of 50° C. oven aging were achieved. It is noteworthy that the amine and epoxy blocked catalyst controls were unable to provide acceptable initial cures and gave extremely poor cure response after oven aging.

When the above experiments, with the same DNNDSA ester, were repeated in combination with Halox 650, an organic corrosion inhibitor from Halox in addition to outstanding initial cure and cure after 50° C. oven aging, significantly better salt spray resistance results were observed compared to the control and systems containing DNNDSA ester alone.

TABLE 5

Catalysts study on Shieldex C 303 white coil primer

| Ingredients | Control | Ex. 51 | Ex. 51 & Halox 650 |
|---|---|---|---|
| Dynapol L205, High MW Polyester Resin (30% Solution) | 50.04 | 55.06 | 55.06 |
| Dynapol L208, High MW Polyester Resin(30% Solution) | 12.51 | 13.76 | 13.76 |
| Solvesso 150, Solvent | 5.63 | 6.16 | 6.19 |
| Dibasic ester, Solvent | 4.38 | 4.82 | 4.82 |
| Diacetone Alcohol, Solvent | 2.50 | 2.75 | 2.75 |
| Silane A187 | 0.65 | 0.72 | 0.72 |
| Shieldex C303 | 6.57 | 7.23 | 7.23 |
| Tiona 472, TiO$_2$ | 2.92 | 3.21 | 3.21 |
| Talc IT Extra | 1.37 | 1.51 | 1.51 |
| Cymel 350, Melamine Crosslinker | 4.32 | 4.75 | 4.75 |
| Total White Base | 90.89 | 100.00 | 100.00 |
| Catalysts Package | | | |
| 42-818-1 Epoxy blocked Phosphoric Acid | 6.28 | 0.00 | 0.00 |
| 42-818-2 Epoxy blocked N-5076 (DDBSA) | 1.52 | 0.00 | 0.00 |
| Halox 650 - Dicarboxylic Acid | 1.40 | 0.00 | 1.40** |
| Catalyst of Ex. 51 | 0.00 | 3.81 | 3.81 |
| Total Active Acid | 0.70/2.10* | 0.57 | 0.57/1.97* |
| Cure Schedule - 25" @ 325° C. | | | |
| ADFT - (Range 0.5-0.75 Mils) | 0.68 | 0.62 | 0.65 |
| Gloss - 20/60 | 1.13/8.1 | 5.0/35.63 | 0.98/6.58 |
| Hardness - Pendulum/Pencil | 71/H-2H | 80/H-2H | 75/H-2H |
| Color - Yellowness Index | −7.85 | −7 . . . 71 | −7.40 |
| Adhesion - % Loss | 0 | 0 | 0 |
| Recoat Adhesion - % Loss | 0 | 0 | 0 |
| 50° C. Oven Age Viscosity & Pendulum Study | | | |
| Pendulum - 7, 14, 21 Days | 77/68/72/78 | 86/92/93/95 | 76/72/74/78 |
| Initial Viscosity - cPs*** | 420 | 910 | 380 |
| 7 Days | 425 | 660 | 420 |
| 14 Days | 450 | 670 | 470 |
| 21 Days | 490 | 665 | 480 |
| 28 Days | 504 | 660 | 475 |

TABLE K

Shieldex C 303 white coil primer Salt Spray Testing Results

| Formula # | Discoloration (Corrosion) in Scribe Area - Millimeter (mm) | | Blisters on Surface - Size & Amount | | Film Remove from Scribe Area - mm |
|---|---|---|---|---|---|
| | 308 Hrs | 500 Hrs | 308 Hrs. | 500 Hrs. | 500 Hrs |
| Control | 0.5-1-5 mm* | 0.5-1.5 mm | #8-9 - 60-70%** | #6-7 Med. 70-80 *** | 13 mm |
| Catalyst Ex. 51 | <0.5 mm | 0.5-1.5 mm | None | None | 13 mm |

TABLE K-continued

Shieldex C 303 white coil primer Salt Spray Testing Results

| Formula # | Discoloration (Corrosion) in Scribe Area - Millimeter (mm) | | Blisters on Surface - Size & Amount | | Film Remove from Scribe Area - mm |
|---|---|---|---|---|---|
| | 308 Hrs | 500 Hrs | 308 Hrs. | 500 Hrs. | 500 Hrs |
| Catalyst Ex. 51 plus Halox 650 | <0.5 mm | 0.5-1.5 mm | None | None | 0.0 mm - None |

Evaluation in an Anticorrosive Coil Primer System Containing Shieldexc-303

In a similar study to the one described above, another catalyst based on a DNNDSA ester of Ex. 52 was used to catalyze the control resin from above containing Shieldex. The results, presented in Table L, clearly show that when a fairly high loading (9.7%) of the catalyst package consisting of two different epoxy blocked acids (current state of the art) were replaced by 3.8% of this catalyst (of the present invention), comparable cures and superior cure after several weeks of 50° C. oven aging were achieved.

TABLE L

| | |
|---|---|
| Shieldex White Base | 100.00 |
| Catalyst of Ex. 52 | 3.81 |
| Cure Schedule 25" @ 325° C. | |
| ADFT - Mils | 0.57 |
| Gloss - 20/60° | 2.8/22.3 |
| MEK - 2X Rubs | 92 |
| Hardness - Pendulum | 100 |
| Initial Viscosity - cPs | 365 |
| 50° C. Oven Aging Viscosity/MEK Double Rubs | |
| 7 Days | 625/80 |
| 14 Days | 650/55 |
| 21 Days | 635/65 |
| 28 Days | 650/50 |

In yet another study the cure response of a typical polyester/melamine based primer formulation containing the basic anti-corrosive pigment, cure response was controlled by a fairly high loading (9.7%) of the catalyst package consisting of two different epoxy blocked acids (current state of the art). When this package was replaced by 2.8% of the new blocked acid catalyst better initial cure and superior cure after several weeks of 50° C. oven aging were achieved. Also the true non-interacting behavior of the new catalysts was seen by the superior viscosity stability of these formulations. Also exceptional humidity resistance and corrosion resistance were seen as compared to the current state of the art formulations. The results are presented in Table M, below:

TABLE M

| Ingredients | Control | New Blocked Acid Catalyst of Ex. 51 |
|---|---|---|
| Masterbatch Primer Catalyst Package | 90.80 | 100.00 |
| Epoxy Blocked Phosphoric Acid | 6.28 | 0.00 |
| Epoxy Blocked DDBSA | 1.52 | 0.00 |
| Halox 650 | 1.40 | 1.40 |
| New Blocked Acid Catalyst I | 0.00 | 2.86 |
| B-1000 Steel Panels (3 × 6") Cure Schedule 25" @ 325° C. | | |
| DFT - Mils(0.5-.75) | 0.65 | 0.61 |
| Gloss | 0.8/3.0 | 0.8/4.4 |
| Adhesion - % Film Loss | 0 | 0 |
| 50° C. Oven Aging Viscosity (cPs)/MEK 2X Rubs | | |
| Initial - 0 Days | 265/100 | 355/100 |
| 7 Days | 328/35 | 350/100 |
| 14 Days | 298/30 | 400/100 |
| 21 Days | 340/14 | 390/100 |
| 28 Days | 430/10 | 410/75 |

Figure 3:
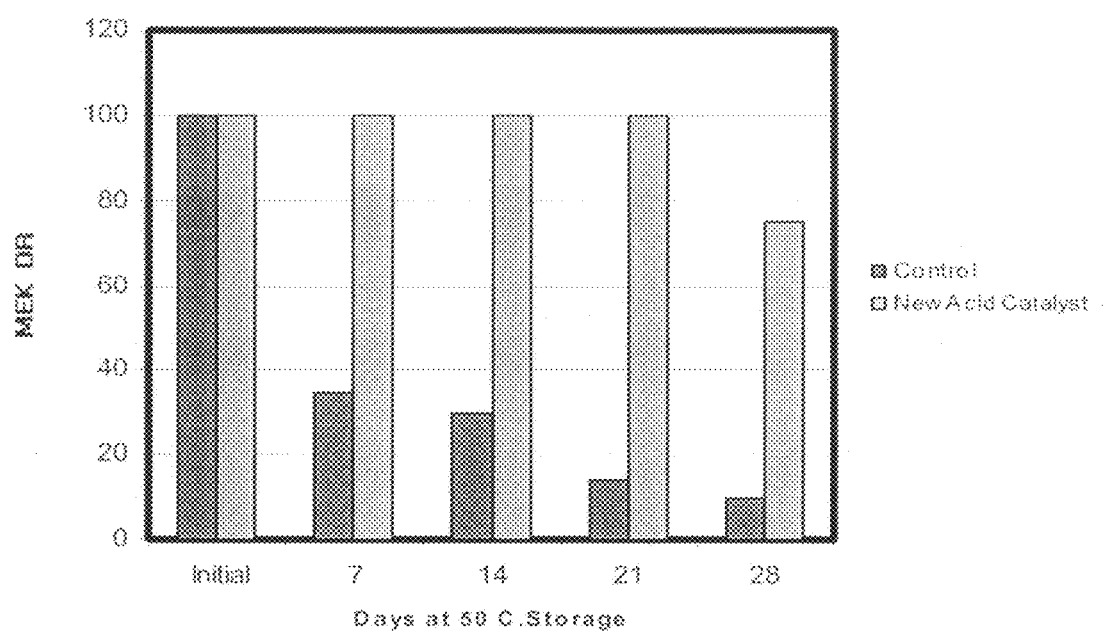
FIG. 3 is a graphical representation of Stability of Formulations containing Catalysts of current invention. The graph provides the methethyl ketone double rubs (MEK DR) verses storage time in days at 50° C. of the inventive example and a comparison example.

FIG. 3 provides a graphical representation of a comparison comprising the catalyst of the present invention and a comparative composition of the prior art.

Humidity Testing Results are presented in Table N, below:

TABLE N

| Formulation | Blisters on panel surface - Size & Amount After 500 Hrs | Gloss readings after Evaluation | |
|---|---|---|---|
| | | 0.0 Hrs | 500 Hrs |
| Control | #9 Small - 5-10% | 1.2/8.8 | 1.3/8.5 |
| Catalyst of Ex. 51 | None | 0.9/5.8 | 0.9/5.8 |

Figure 2:
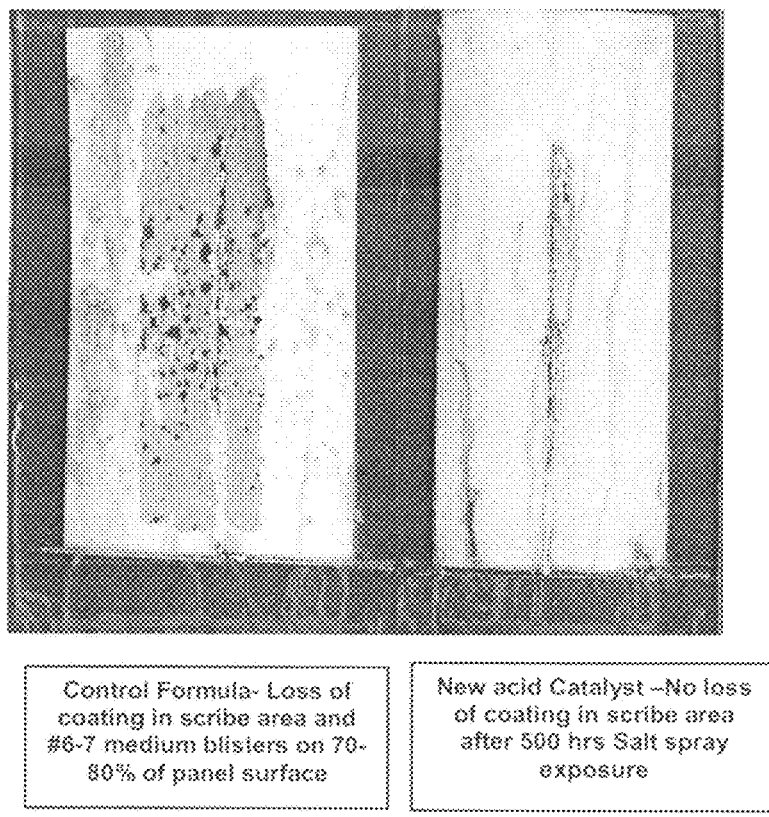
FIG. 2 illustrates the results of Wet Adhesion after 500 hours of Salt Spray Exposures.

Wet Adhesion, 500 Hrs. Salt Spray Exposures the results of which are presented in FIG. 2.

While the present invention has been described herein with some specificity, and with reference to certain preferred embodiments thereof, those of ordinary skill in the art will recognize numerous variations, modifications and substitutions of that which has been described which can be made, and which are within the scope and spirit of the invention. It is intended that all of these modifications and variations be within the scope of the present invention as described and claimed herein, and that the invention be limited only by the scope of the claims which follow, and that such claims be interpreted as broadly as is reasonable.

Throughout this document, various books, patents, patent applications, journal articles, web sites and other publications have been cited. The entireties of each of these books, patents, patent applications, journal articles, web sites and other publications are hereby incorporated by reference herein.

What is claimed is:

1. A curable coating composition comprising a total solids content of at least 50 percent, said coating composition being capable of acid catalyzed crosslinking and containing at least one active hydrogen-containing resin, at least one curing agent present externally and/or internally as a part of the active hydrogen-containing resin, optionally, at least one basic anticorrosive pigment, and a catalytic amount of at least one non-ionic ester of a sulfonic acid having the following structural formula (s):

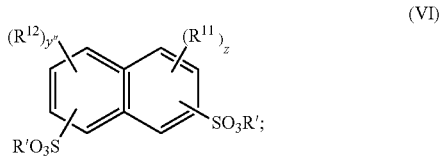

R is

wherein,
E is

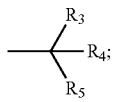

or a cycloalkyl having from 3 to 20 carbon atoms;
R1 is hydrogen, carboalkoxy, C3-C20 alkyl, C6-C18 aryl, or C3-C20 cycloalkyl; R2 is hydrogen, carboalkoxy, C3-C20 alkyl, C6-C18 aryl, or C3-C20 cycloalkyl; R3 is hydrogen, carboalkoxy, acyloxy, N-alkylcarbamyloxy, N-arylcarbamyloxy, C3-C20 alkyl, C6-C18 aryl, or C3-C20 cycloalkyl; R4 is hydrogen, carboalkoxy, acyloxy, N-alkylcarbamyloxy, N-arylcarbamyloxy, C3-C20 alkyl, C6-C18 aryl, or C3-C20 cycloalkyl; R5 is hydrogen, carboalkoxy, acyloxy, N-alkylcarbamyloxy, N-arylcarbamyloxy, C3-C20 alkyl, C6-C18 aryl, or C3-C20 cycloalkyl
R11 and R12 independently are the same or different and are linear or branched alkyl group having from 6 to 40 carbons;
y" is 0 to 3, z is 0 to 3, and y"+z is 1 to 4.

2. The composition of claim 1 wherein R1, R2, R3, R4, and R5 are independently sulfonate substituted alkyls.

3. The composition of claim 1 wherein the active hydrogen-containing resin comprises a polymeric polyol having a hydroxyl functionality of at least two.

4. The composition of claim 3 wherein the polymeric polyol is selected from the group consisting of hydrocarbon polyols, ester polyols, ether polyols, polyester polyols, polyether polyols, amide polyols, polyimide polyols, acrylic polyols, urethane polyols, polyurethane polyols, cyclic nitrogen-containing polyols, urea polyols, polyurea polyols and mixtures thereof.

5. The composition of claim 3 wherein the polymeric polyol comprises a polyester polyol.

6. The composition of claim 3 wherein the polymeric polyol comprises an acrylic polyol.

7. The composition of claim 3 wherein the polymeric polyol comprises a polyurethane polyol.

8. The composition of claim 1 wherein the curing agent comprises an aminoplast resin.

9. The composition of claim 8 wherein the aminoplast resin comprises a melamine-formaldehyde condensation product.

10. The composition of claim 8 wherein the aminoplast resin comprises an at least partially alkylated melamine-formaldehyde condensation product.

11. The composition of claim 10 wherein the aminoplast resin comprises at least partially methylated melamine-formaldehyde condensation product.

12. The composition of claim 10 wherein R1 and R2 are independently selected from the group consisting of hydrogen, propyl, isopropyl, 1-isobutyryloxy-2-methyl-2-propyl and carboethoxy; and R3, R4, and R5 are independently selected from the group consisting of hydrogen, N-butylcarbamyloxy and isobutyrloxymethyl and.

13. The composition of claim 1 wherein the basic anticorrosive pigment comprises an oxyaminophosphate salt of magnesium or an oxyaminophosphate salt of magnesium modified with a calcium salt or a calcium ion exchange anticorrosive pigment.

14. The composition of claim 1 wherein the sulfonic acid ester comprises at least one compound selected from the group consisting of di(octyl)dinonyl naphthalene disulfonate; di(dodecyl)dinonyl naphthalene disulfonate; and dihexyl, dicyclohexyl, bis hexylene, didecyl, ditetradecyl, dihexadecyl, dioctadecyl, di(1-methyl-4-(1-methyethenyl)-cyclohexyl), di(bicyclo-(3,3,0)-oct-1-yl, bicycle-(2,2,1,) hepta-2,5-diyl), dinorbornyl, bis(dicyclopentyl)dinonyl naphthalene disulfonate.

15. The composition of claim 1 wherein the amount of catalyst ranges from about 0.1 to about 20 percent by weight based on the resinous components of the composition.

16. The composition of claim 1 wherein the amount of anticorrosive pigment ranges from about 1.0 to about 20 percent by weight based on resinous components of the composition.

17. The composition of claim 1 wherein said composition is sprayable.

18. The composition of claim 1 wherein the at least one active hydrogen-containing resin comprises a silicone containing resin.

19. A base coating comprising the composition of claim 1.

20. A primer coating comprising the composition of claim 1.

21. A clear coating comprising the composition of claim 1.

22. The composition of claim 1, wherein the composition is cured.

23. A process for coating a substrate with high solids, organic solvent based, sprayable coating composition, comprising the steps of:
  a) spraying a substrate electrostatically with an organic solvent based, sprayable coating composition having a total solids content of at least 50 percent, comprising:
    i) an active hydrogen-containing resin;
    ii) a curing agent present either externally and/or internally as a part of the active hydrogen-containing resin;
    iii) catalytic amount of the catalyst of claim 1; and, optionally,
    iv) an anticorrosive pigment; and
  b) baking the coated substrate of step (a) at a temperature of about 80° C. to about 350° C. to form a cured coating.

24. A method for forming a multi-layer coating comprising:
   i) applying, sequentially, a layer of a primer coating composition, applying a layer of a base coating composition, and applying a layer of a clear coating composition on a substrate; and
   ii) curing, simultaneously, in a single bake all of the applied three layers,
wherein at least one of the coating compositions comprises a catalytic amount of the catalyst of claim 1.

25. A non-ionic ester of a sulfonic acid comprising the following structural formula:

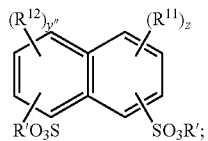

wherein,
R11 and R12 independently are the same or different and are linear or branched alkyl group having from 6 to 40 carbons;
R' is

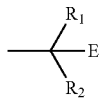

E is

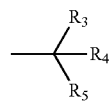

or a cycloalkyl having from 3 to 20 carbon atoms;
R1 is hydrogen, carboalkoxy, C3-C20 alkyl, C6-C18 aryl, or C3-C20 cycloalkyl; R2 is hydrogen, carboalkoxy, C3-C20 alkyl, C6-C18 aryl, or C3-C20 cycloalkyl; R3 is hydrogen, carboalkoxy, acyloxy, N-alkylcarbamyloxy, N-arylcarbamyloxy, C3-C20 alkyl, C6-C18 aryl, or C3-C20 cycloalkyl; R4 is hydrogen, carboalkoxy, acyloxy, N-alkylcarbamyloxy, N-arylcarbamyloxy, C3-C20 alkyl, C6-C18 aryl, or C3-C20 cycloalkyl; R5 is hydrogen, carboalkoxy, acyloxy, N-alkylcarbamyloxy, N-arylcarbamyloxy, C3-C20 alkyl, C6-C18 aryl, or C3-C20 cycloalkyl
y" is 0 to 3, z is 0 to 3, and y"+z is 1 to 4.

26. The non-ionic ester of sulfonic acid of claim 25 wherein said sulfonic ester comprises at least one compound selected from the group consisting of di(octyl)dinonyl naphthalene disulfonate; di(dodecyl)dinonyl naphthalene disulfonate; and dihexyl, dicyclohexyl, bis hexylene, didecyl, ditetradecyl, dihexadecyl, dioctadecyl, di(1-methyl-4-(1-methyethenyl)-cyclohexyl), di (bicyclo-(3,3,0)-oct-1-yl), bicycle-(2,2,1) hepta-2,5-diyl), dinorbornyl, bis(dicyclopentyl)dinonyl naphthalene disulfonate.

* * * * *